United States Patent
Hoang et al.

(10) Patent No.: US 11,625,586 B2
(45) Date of Patent: *Apr. 11, 2023

(54) REALIZATION OF NEURAL NETWORKS WITH TERNARY INPUTS AND TERNARY WEIGHTS IN NAND MEMORY ARRAYS

(71) Applicant: SanDisk Technologies LLC, Addison, TX (US)

(72) Inventors: Tung Thanh Hoang, San Jose, CA (US); Won Ho Choi, San Jose, CA (US); Martin Lueker-Boden, Fremont, CA (US)

(73) Assignee: SanDisk Technologies LLC, Addison, TX (US)

( * ) Notice: Subject to any disclaimer, the term of this patent is extended or adjusted under 35 U.S.C. 154(b) by 630 days.

This patent is subject to a terminal disclaimer.

(21) Appl. No.: 16/653,365

(22) Filed: Oct. 15, 2019

(65) Prior Publication Data

US 2021/0110244 A1    Apr. 15, 2021

(51) Int. Cl.
G06N 3/063    (2006.01)
G06F 17/18    (2006.01)

(52) U.S. Cl.
CPC ............ *G06N 3/063* (2013.01); *G06F 17/18* (2013.01)

(58) Field of Classification Search
CPC .............................. G06N 3/063; G06F 17/18
See application file for complete search history.

(56) References Cited

U.S. PATENT DOCUMENTS 7,324,366 B2   1/2008   Bednorz et al.
7,505,347 B2   3/2009   Rinerson et al.
(Continued)

FOREIGN PATENT DOCUMENTS

CN   110597555 A   12/2019
CN   110598858 A   12/2019
(Continued)

OTHER PUBLICATIONS

International Search Report & The Written Opinion of the International Searching Authority dated Sep. 11, 2020, International Application No. PCT/US2020/024625.
(Continued)

*Primary Examiner* — Kyle Vallecillo
(74) *Attorney, Agent, or Firm* — Vierra Magen Marcus LLP

(57) ABSTRACT

Use of a NAND array architecture to realize a binary neural network (BNN) allows for matrix multiplication and accumulation to be performed within the memory array. A unit synapse for storing a weight of a BNN is stored in a pair of series connected memory cells. A binary input is applied on a pair of word lines connected to the unit synapse to perform the multiplication of the input with the weight. The results of such multiplications are determined by a sense amplifier, with the results accumulated by a counter. The arrangement extends to ternary inputs to realize a ternary-binary network (TBN) by adding a circuit to detect 0 input values and adjust the accumulated count accordingly. The arrangement further extends to a ternary-ternary network (TTN) by allowing 0 weight values in a unit synapse, maintaining the number of 0 weights in a register, and adjusting the count accordingly.

16 Claims, 36 Drawing Sheets

(56) References Cited

U.S. PATENT DOCUMENTS

| | | | |
|---|---|---|---|
| 8,416,624 | B2 | 4/2013 | Lei et al. |
| 8,634,247 | B1 | 1/2014 | Sprouse et al. |
| 8,634,248 | B1 | 1/2014 | Sprouse et al. |
| 8,773,909 | B2 | 7/2014 | Li et al. |
| 8,780,632 | B2 | 7/2014 | Sprouse et al. |
| 8,780,633 | B2 | 7/2014 | Sprouse et al. |
| 8,780,634 | B2 | 7/2014 | Sprouse et al. |
| 8,780,635 | B2 | 7/2014 | Li et al. |
| 8,792,279 | B2 | 7/2014 | Li et al. |
| 8,811,085 | B2 | 8/2014 | Sprouse et al. |
| 8,817,541 | B2 | 8/2014 | Li et al. |
| 9,098,403 | B2 | 8/2015 | Sprouse et al. |
| 9,104,551 | B2 | 8/2015 | Spouse et al. |
| 9,116,796 | B2 | 8/2015 | Sprouse et al. |
| 9,384,126 | B1 | 7/2016 | Sprouse et al. |
| 9,430,735 | B1 | 8/2016 | Vali et al. |
| 9,887,240 | B2 | 2/2018 | Shimabukuro et al. |
| 9,965,208 | B1 | 5/2018 | Roohparvar et al. |
| 10,127,150 | B2 | 11/2018 | Sprouse et al. |
| 10,249,360 | B1* | 4/2019 | Chang ............... G11C 13/0002 |
| 10,459,724 | B2 | 10/2019 | Yu et al. |
| 10,535,391 | B2 | 1/2020 | Osada et al. |
| 11,170,290 | B2 | 11/2021 | Hoang et al. |
| 11,328,204 | B2 | 5/2022 | Choi et al. |
| 2014/0133228 | A1 | 5/2014 | Sprouse et al. |
| 2014/0133233 | A1 | 5/2014 | Li et al. |
| 2014/0133237 | A1 | 5/2014 | Sprouse et al. |
| 2014/0136756 | A1 | 5/2014 | Sprouse et al. |
| 2014/0136757 | A1 | 5/2014 | Sprouse et al. |
| 2014/0136758 | A1 | 5/2014 | Sprouse et al. |
| 2014/0136760 | A1 | 5/2014 | Sprouse et al. |
| 2014/0136762 | A1 | 5/2014 | Li et al. |
| 2014/0136763 | A1 | 5/2014 | Li et al. |
| 2014/0136764 | A1 | 5/2014 | Li et al. |
| 2014/0156576 | A1 | 6/2014 | Nugent |
| 2014/0136761 | A1 | 7/2014 | Li et al. |
| 2014/0294272 | A1 | 10/2014 | Madabhushi et al. |
| 2015/0324691 | A1 | 11/2015 | Dropps et al. |
| 2016/0026912 | A1 | 1/2016 | Falcon et al. |
| 2016/0054940 | A1 | 2/2016 | Khoueir et al. |
| 2017/0017879 | A1 | 1/2017 | Kataeva |
| 2017/0054032 | A1 | 2/2017 | Tsukamoto |
| 2017/0098156 | A1 | 4/2017 | Nino et al. |
| 2017/0228637 | A1 | 8/2017 | Santoro et al. |
| 2018/0039886 | A1 | 2/2018 | Umuroglu et al. |
| 2018/0075339 | A1 | 3/2018 | Ma et al. |
| 2018/0082181 | A1 | 3/2018 | Brothers et al. |
| 2018/0144240 | A1 | 5/2018 | Garbin et al. |
| 2018/0315473 | A1 | 11/2018 | Yu et al. |
| 2018/0357533 | A1* | 12/2018 | Inoue .................. G06N 3/0454 |
| 2019/0065896 | A1 | 2/2019 | Lee et al. |
| 2019/0087715 | A1 | 3/2019 | Jeng |
| 2019/0102359 | A1* | 4/2019 | Knag ....................... G06G 7/16 |
| 2019/0108436 | A1 | 4/2019 | David et al. |
| 2019/0221257 | A1 | 7/2019 | Jeng et al. |
| 2019/0251425 | A1 | 8/2019 | Jaffari et al. |
| 2019/0280694 | A1* | 9/2019 | Obradovic ........ H01L 27/11803 |
| 2020/0034697 | A1 | 1/2020 | Choi et al. |
| 2020/0202203 | A1 | 6/2020 | Nakayama et al. |
| 2020/0234137 | A1 | 7/2020 | Chen et al. |
| 2020/0301668 | A1 | 10/2020 | Li |
| 2020/0311523 | A1 | 10/2020 | Hoang et al. |
| 2021/0110244 | A1 | 4/2021 | Hoang et al. |
| 2021/0192325 | A1* | 6/2021 | Hoang ............... G11C 13/0069 |
| 2022/0100508 | A1 | 3/2022 | Pawlowski |
| 2022/0179703 | A1 | 6/2022 | Vincent |

FOREIGN PATENT DOCUMENTS

| | | |
|---|---|---|
| JP | 2016/042359 A | 3/2016 |
| KR | 10-2019-009467 A | 8/2019 |

OTHER PUBLICATIONS

English Abstract of JP Publication No. JP2016/042359 published Mar. 31, 2016.

Rastegari, Mohammad et al., "XNOR-Net: ImageNet Classification Using Binary Convolutional Neural Networks," proceedings ECCV 2016, Aug. 2016, 55 pages.

Wan, Diwen, et al., "TBN: Convolutional Neural Network with Ternary Inputs and Binary Weights," ECCV 2018, Oct. 2018, 18 pages.

Chen, Yu-Hsin, et al., "Eyeriss: An Energy-Efficient Reconfigurable Accelerator for Deep Convolutional Neural Networks," IEEE Journal of Solid-State Circuits, Feb. 2016, 12 pages.

Sun, Xiaoyu, et al., "Fully Parallel RRAM Synaptic Array for Implementing Binary Neural Network with (+1, −1) Weights and (+1, 0) Neurons," 23rd Asia and South Pacific Design Automation Conference, Jan. 2018, 6 pages.

Gonugondla, Sujan K., et al., "Energy-Efficient Deep In-memory Architecture for NAND Flash Memories," IEEE International Symposium on Circuits and Systems (ISCAS), May 2018, 5 pages.

Nakahara, Hiroki, et al., "A Memory-Based Realization of a Binarized Deep Convolutional Neural Network," International Conference on Field-Programmable Technology (FPT), Dec. 2016, 4 pages.

Takeuchi, Ken, "Data-Aware NAND Flash Memory for Intelligent Computing with Deep Neural Network," IEEE International Electron Devices Meeting (IEDM), Dec. 2017, 4 pages.

Mochida, Reiji, et al., "A 4M Synapses integrated Analog ReRAM based 66.5 TOPS/W Neural-Network Processor with Cell Current Controlled Writing and Flexible Network Architecture," Symposium on VLSI Technology Digest of Technical Papers, Jun. 2018, 2 pages.

Chiu, Pi-Feng, et al., "A Differential 2R Crosspoint RRAM Array With Zero Standby Current," IEEE Transactions on Circuits and Systems—II: Express Briefs, vol. 62, No. 5, May 2015, 5 pages.

Chen, Wei-Hao, et al., "A 65nm 1Mb Nonvolatile Computing-in-Memory ReRAM Macro with Sub-16ns Mulitply-and-Accumulate for Binary DNN AI Edge Processors," IEEE International Solid-State Circuits Conference, Feb. 2018, 3 pages.

Liu, Rui, et al., "Parallelizing SRAM Arrays with Customized Bit-Cell for Binary Neural Networks," DAC '18, Jun. 2018, 6 pages.

Courbariaux, Maithieu, et al., "Binarized Neural Networks: Training Neural Networks with Weights and Activations Constrained to +1 or −1," arXiv.org, Mar. 2016, 11 pages.

U.S. Appl. No. 62/702,713, filed Jul. 24, 2018.
U.S. Appl. No. 16/052,420, filed Aug. 1, 2018.
U.S. Appl. No. 16/368,347, filed Mar. 28, 2019.
U.S. Appl. No. 16/405,178, filed May 7, 2019.
U.S. Appl. No. 16/414,143, filed May 16, 2019.
U.S. Appl. No. 16/368,441, filed Mar. 28, 2019.
U.S. Appl. No. 16/653,346, filed Oct. 15, 2019.

Simon, Noah, et al., "A Sparse-Group Lasso," Journal of Computational and Graphical Statistics, vol. 22, No. 2, pp. 231-245, downloaded by Moskow State Univ Bibliote on Jan. 28, 2014.

"CS231n Convolutional Neural Networks for Visual Recognition," [cs231.github.io/neural-networks-2/#reg], downloaded on Oct. 15, 2019, pp. 1-15.

Krizhevsky, Alex, et al., "ImageNet Classification with Deep Convolutional Neural Networks," [http://code.google.com/p/cuda-convnet/ ], downloaded on Oct. 15, 2019, 9 pages.

Shafiee, Ali, et al., "ISAAC: A Convolutional Neural Network Accelerator with In-Situ Analog Arithmetic in Crossbars," ACM/IEEE 43rd Annual International Symposium on Computer Architecture (ISCA), Oct. 5, 2016, 13 pages.

Han, Song, et al., "Learning both Weights and Connections for Efficient Neural Networks," Conference paper, NIPS, Oct. 2015, 9 pages.

Jia, Yangqing, "Learning Semantic Image Representations at a Large Scale," Electrical Engineering and CS, University of Berkeley, Technical Report No. UCB/EECS-2014-93, May 16, 2014, 104 pages.

(56) References Cited

OTHER PUBLICATIONS

Wen, Wei, et al., "Learning Structured Sparsity in Deep Neural Networks," 30th Conference on Neural Information Processing Systems (NIPS 2016), Nov. 2016, 9 pages.
Wang, Peiqi, et al., "SNrram: An Efficient Sparse Neural Network Computation Architecture Based on Resistive Random-Access Memory," DAC '18, Jun. 24-29, 2018, 6 pages.
Notice of Allowance dated Jan. 24, 2022, U.S. Appl. No. 16/368,347, filed Mar. 28, 2019.
Notice of Allowance dated Mar. 11, 2020, U.S. Appl. No. 16/414,143, filed May 16, 2019.
International Search Report & The Written Opinion of the International Searching Authority dated Jul. 30, 2020, International Application No. PCT/US2020/024615.
Chiu, Pi-Feng, et al., "A Binarized Neural Network Accelerator with Differential Crosspoint Memristor Array for Energy-Efficient MAC Operations," 2019 IEEE International Symposium on Circuits and Systems (ISCAS), May 2019, Abstract only.
Sun, Xiaoyu, et al., "Low-VDD Operation of SRAM Synaptic Array for Implementing Ternary Network," IEEE Transactions on Very Large Scale Integration (VLSI) Systems, vol. 25, No. 10, Jul. 2017, Abstract only.
Kim, Hyeonuk, et al., "NAND-Net: Minimizing Computational Complexity of In-Memory Processing for Binary Neural Networks," 2019 IEEE International Symposium on High Performance Computer Architecture (HPCA), Mar. 2019, Abstract only.
English Abstract of KR Publication No. KR 10-2019-0094679 published Aug. 14, 2019.
Non-Final Office Action dated Jun. 23, 2022, U.S. Appl. No. 16/653,346, filed Oct. 15, 2019.
Zheng, Shixuan, et al., "An Efficient Kernel Transformation Architecture for Binary-and Ternary-Weight Neural Network Inference," DAC' 18, Jun. 24-29, 2018, 6 pages.
Notice of Allowance dated Feb. 20, 2020, U.S. Appl. No. 16/405,178, filed May 7, 2019.
Resch, Salonik, et al., "PIMBALL: Binary Neural Networks in Spintronic Memory," ACM Trans Arch. Code Optim., vol. 37, No. 4, Article 111, Aug. 2018, 25 pages.
Zamboni, Maurizio, et al., "In-Memory Binary Neural Networks," Master's Thesis, Politecino Di Torino, Apr. 10, 2019, 327 pages.
Natsui, Masanori, et al., "Design of an energy-efficient XNOR gate based on MTJ-based nonvolatile logic-in-memory architecture for binary neural network hardware," Japanese Journal of Applied Physics 58, Feb. 2019, 8 pages.
U.S. Appl. No. 16/722,580, filed Dec. 20, 2019.
Response to Office Action dated Sep. 8, 2022, U.S. Appl. No. 16/653,346, filed Oct. 15, 2019.
Non-final Office Action dated Sep. 13, 2022, U.S. Appl. No. 16/722,580, filed Dec. 20, 2019.
Non-final Office Action dated Sep. 15, 2022, U.S. Appl. No. 16/901,302, filed Jun. 15, 2020.
U.S. Appl. No. 16/901,302, filed Jun. 15, 2020.
Baugh, Charles R., et al., "A Two's Complement Parallel Array Multiplication Algorithm," IEEE Transactions on Computers, vol. C-22, No. 12, Dec. 1973, 3 pages.
Hoang, Tung Thanh, et al., "Data-Width-Driven Power Gating of Integer Arithmetic Circuits," IEEE Computer Society Annual Symposium on VLSI, Jul. 2012, 6 pages.
Choi, Won Ho, et al., "High-precision Matrix-Vector Multiplication Core using Binary NVM Cells," Powerpoint, Western Digital Research, downloaded on Jun. 15, 2020, 7 pages.
Ni, Leibin, et al., "An Energy-Efficient Digital ReRAM-Crossbar-Based CNN With Bitwise Parallelism," IEEE Journal of Exploratory Solid-State Computational Devices and Circuits, May 2017, 10 pages.
Zhou, Shuchang, et al., "DoReFa-Net: Training Low Bitwidth Convolutional Neural Networks with Low Bitwidth Gradients," [arXiv.org > cs > arXiv:1606.06160], Feb. 2, 2018, 13 pages.
U.S. Appl. No. 16/908,864, filed Jun. 23, 2020.
International Search Report & The Written Opinion of the International Searching Authority dated Jul. 9, 2020, International Application No. PCT/US2020/024612.
Houxiang Ji, et al., "RECOM: An Efficient Resistive Accelerator for Compressed Deep Neural Networks," in 2018 Design, Automation & Test in Europe Conference & Exhibition, Mar. 23, 2018, Abstract only.
Yang, Tzu-Hsien, et al., "Sparse ReRAM Engine: Joint Exploration of Activation and Weight Sparsity in Compressec Neural Networks," Computer Architecture, pp. 236-249, Jun. 26, 2019, Abstract only.
Notice of Allowance dated Jul. 12, 2021, U.S. Appl. No. 16/368,441, filed Mar. 28, 2019.
Kim, Hyeonuk, et al., "NAND-Net: Minimizing Computational Complexity of In-Memory Processing for Binary Neural Networks," 2019 IEEE International Symposium on High Performance Computer Architecture (HPCA), Mar. 2019.
Ji, H., et al., "ReCOM: An efficient resistive accelerator for compressed deep neural networks," 2018 Design, Automation & Test in Europe Conference & Exhibition, 2018, pp. 237-240.
Notice of Allowance dated Oct. 14, 2022, U.S. Appl. No. 16/653,346, filed Oct. 15, 2019.

* cited by examiner

| Input (IN) | Weight (W) | Output (IN x W) |
|---|---|---|
| -1 | -1 | +1 |
| -1 | +1 | -1 |
| +1 | -1 | -1 |
| +1 | +1 | +1 |
Figure 9
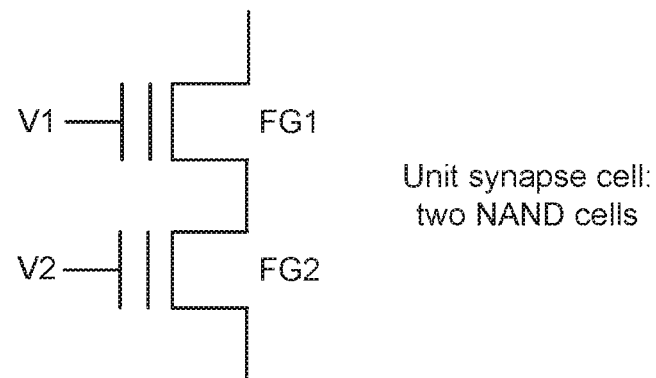
Figure 10
Unit synapse cell: two NAND cells
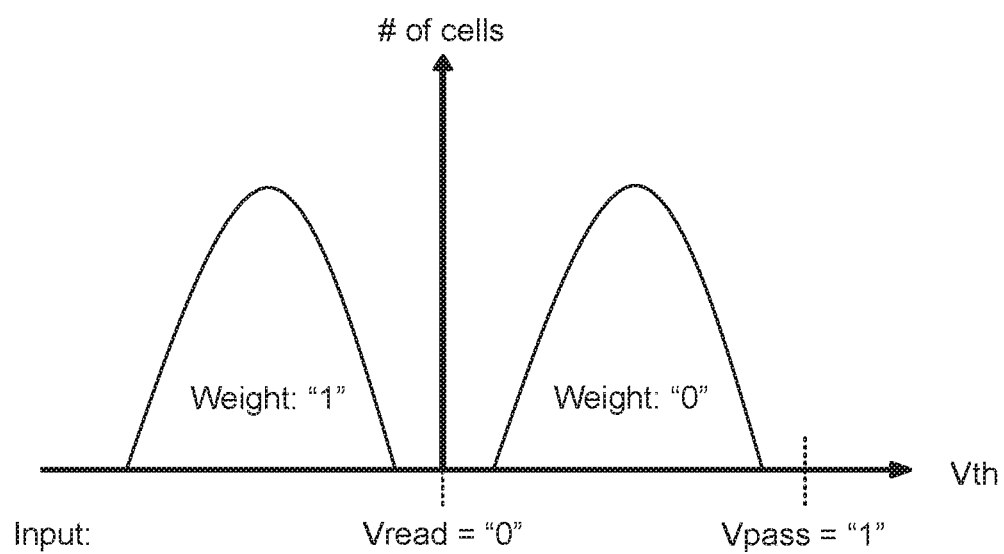
Figure 11

| Case | Input logic | Input voltage | | Weight logic | Weight Vth | | Output logic | Discharged current | Output voltage |
|---|---|---|---|---|---|---|---|---|---|
| | | V1 | V2 | | FG1 | FG2 | | | |
| | | "1" = Vpass | "0" = Vread | | | | | | |
| 1 | -1 | 0 | 0 | -1 | 0 | 1 | +1 | Icell | ΔV drop |
| 2 | +1 | 0 | 1 | -1 | 0 | 1 | -1 | x | No drop |
| 3 | -1 | 1 | 0 | +1 | 1 | 0 | -1 | x | No drop |
| 4 | +1 | 0 | 1 | +1 | 1 | 0 | +1 | Icell | ΔV drop |

Figure 13

| Case | Input logic | Input voltage V1 "1"=Vpass | Input voltage V2 "0"=Vread | Weight logic | Weight Vth FG1 | Weight Vth FG2 | Output logic | Discharged current | Output voltage |
|---|---|---|---|---|---|---|---|---|---|
| 1 | -1 | 0 | 1 | -1 | 0 | 1 | +1 | Icell | ΔV drop |
| 2 | +1 | 1 | 1 | -1 | 0 | 1 | -1 | x | No drop |
| 3 | -1 | 0 | 0 | +1 | 1 | 0 | -1 | x | No drop |
| 4 | +1 | 0 | 1 | +1 | 1 | 0 | +1 | Icell | ΔV drop |
| 5 | 0 | 0 | 0 | -1 | 1 | 0 | -1 | x | No drop |
| 6 | 0 | 0 | 0 | +1 | 0 | 1 | -1 | x | No drop |

Figure 15

| BNN algebra | |
|---|---|
| Binary $I^{bnn}$ | 1 -1 1 1 -1 -1 1 -1 |
| Binary $W^{bnn}$ | -1 1 1 -1 -1 -1 1 -1 |
| Accumulate add | sum( -1 -1 1 -1 1 1 1 1 ) |
| Dot-product $P^{bnn\_dec}$ | 2 |
| Derived $P^{bnn\_dec}$ | $2* CNT^{bnn\_out} - S$  (Eq. 1) |

Figure 17

| SLC NAND-based BNN | | |
|---|---|---|
| $I^{bnn}$ | | 1 0 1 1 0 0 1 0 |
| $W^{bnn}$ | | 0 1 1 0 0 0 1 0 |
| SA output | XNOR( | 0 0 1 0 1 1 1 1 ) |
| $CNT^{bnn\_out}$ | popcount | 5 (count number of 1 bits) |

Figure 18

| TBN algebra | | | | | | | | | |
|---|---|---|---|---|---|---|---|---|---|
| Ternary $I^{tbn}$ | | 1 | 0 | 0 | 1 | -1 | 0 | 1 | -1 |
| Binary $W^{tbn}$ | | -1 | 1 | 1 | -1 | -1 | -1 | 1 | -1 |
| Accumulate add | sum( | -1 | 0 | 0 | -1 | 1 | 0 | 1 | 1 ) |
| Dot-product $P^{tbn\_dec}$ | 1 | | | | | | | | |

Figure 20

| SLC NAND-based TBN | | | | | | | | | |
|---|---|---|---|---|---|---|---|---|---|
| $I^{bin}$ | | 1 | 0 | 0 | 1 | 0 | 0 | 1 | 0 |
| $W^{bin}$ | | 0 | 1 | 1 | 0 | 0 | 0 | 1 | 0 |
| $P^{tbn}$ (SA output) | XNOR( | 0 | 0 | 0 | 0 | 1 | 1 | 1 | 1 ) |
| $CNT^{tbn\_out}$ | popcount | 4 | | | | | | | |

Figure 21

| Case | Input logic | Input voltage | | Weight logic | Weight Vth | | Output logic | Discharged current | Output voltage |
|---|---|---|---|---|---|---|---|---|---|
| | | V1 "1" = Vpass | V2 "0" = Vread | | FG1 | FG2 | | | |
| 1 | -1 | | | -1 | 0 | 1 | +1 | Icell | ΔV drop |
| 2 | +1 | 0 | 1 | -1 | 0 | 1 | -1 | x | No drop |
| 3 | -1 | 1 | 0 | +1 | 1 | 0 | -1 | x | No drop |
| 4 | +1 | 0 | 1 | +1 | 1 | 0 | +1 | Icell | ΔV drop |
| 5 | 0 | 0 | 0 | -1 | 1 | 0 | -1 | x | No drop |
| 6 | 0 | 0 | 1 | +1 | 0 | 1 | -1 | x | No drop |
| 7 | +1 | 0 | 0 | 0 | 1 | 1 | +1 | Icell | ΔV drop |
| 8 | -1 | 1 | 0 | 0 | 1 | 1 | +1 | Icell | ΔV drop |
| 9 | 0 | 0 | 0 | 0 | 1 | 1 | +1 | Icell | 2ΔV drop |

Figure 28

| TTN algebral | | | | | | | | |
|---|---|---|---|---|---|---|---|---|
| Ternary $I^{ttn}$ | | 1 | 0 | 0 | 1 | -1 | 0 | 1 | -1 |
| Ternary $W^{ttn}$ | | -1 | 1 | 0 | 0 | 0 | -1 | 1 | -1 |
| Accumulate add | sum( | -1 | 0 | 0 | 0 | 0 | 0 | 1 | 1 ) |
| Dot-product $P^{ttn\_dec}$ | | 1 | | | | | | | |

Figure 29

| SLC NAND-based TTN | | | | | | | | |
|---|---|---|---|---|---|---|---|---|
| $I^{bin}$ | | 1 | 0 | 0 | 1 | 0 | 0 | 1 | 0 |
| $W^{bin}$ | | 0 | 1 | 0 | 0 | 0 | 0 | 1 | 0 |
| $P^{ttn}$ (SA output) | xnor( | 0 | 0 | 1 | 1 | 1 | 1 | 1 | 1 ) |
| $CNT^{ttn\_out}$ | popcount | 6 | | | | | | | |

Figure 30

REALIZATION OF NEURAL NETWORKS WITH TERNARY INPUTS AND TERNARY WEIGHTS IN NAND MEMORY ARRAYS

BACKGROUND

Artificial neural networks are finding increasing usage in artificial intelligence and machine learning applications. In an artificial neural network, a set of inputs is propagated through one or more intermediate, or hidden, layers to generate an output. The layers connecting the input to the output are connected by sets of weights that are generated in a training or learning phase by determining a set of a mathematical manipulations to turn the input into the output, moving through the layers calculating the probability of each output. Once the weights are established, they can be used in the inference phase to determine the output from a set of inputs. Although such neural networks can provide highly accurate results, they are extremely computationally intensive, and the data transfers involved in reading the weights connecting the different layers out of memory and transferring them into the processing units of a processing unit can be quite intensive.

BRIEF DESCRIPTION OF THE DRAWING

Like-numbered elements refer to common components in the different figures.

FIG. 9 is a table illustrating the output of a binary neural network in response to the different input-weight combinations.

FIG. 10 illustrates an embodiment for a unit synapse cell for storing a binary weight in a pair of series connected memory cells.

FIG. 11 illustrates the distribution of threshold voltages for the storage of data states on a binary, or single level cell (SLC), memory.

FIGS. 12 and 13 illustrate an embodiment for implementing a binary neural network using a pair of series connected SLC memory cells as unit synapse.

FIGS. 14 and 15 respectively correspond to FIGS. 12 and 13 as extended to include a "0" input logic value for implementing a ternary input.

FIGS. 17 and 18 consider an example of the computation of a dot-product for the binary neural network algebra and how to implement this using a counter based summation digital circuit for an SLC NAND binary neural network (BNN) embodiment.

FIGS. 20 and 21 consider an example extending the computation of a dot-product for a ternary-binary neural network and how to implement this using a counter based summation digital circuit for an SLC NAND ternary-binary network (TBN) embodiment.

FIGS. 27 and 28 respectively correspond to FIGS. 14 and 15 as extended to include a "0" weight value for implementing a ternary input ternary weight neural network.

FIGS. 29 and 30 consider an example extending the computation of a dot-product for a ternary-ternary neural network and how to implement this using a counter based summation digital circuit for an SLC NAND ternary-ternary network (TTN) embodiment.

DETAILED DESCRIPTION

Figure 1:
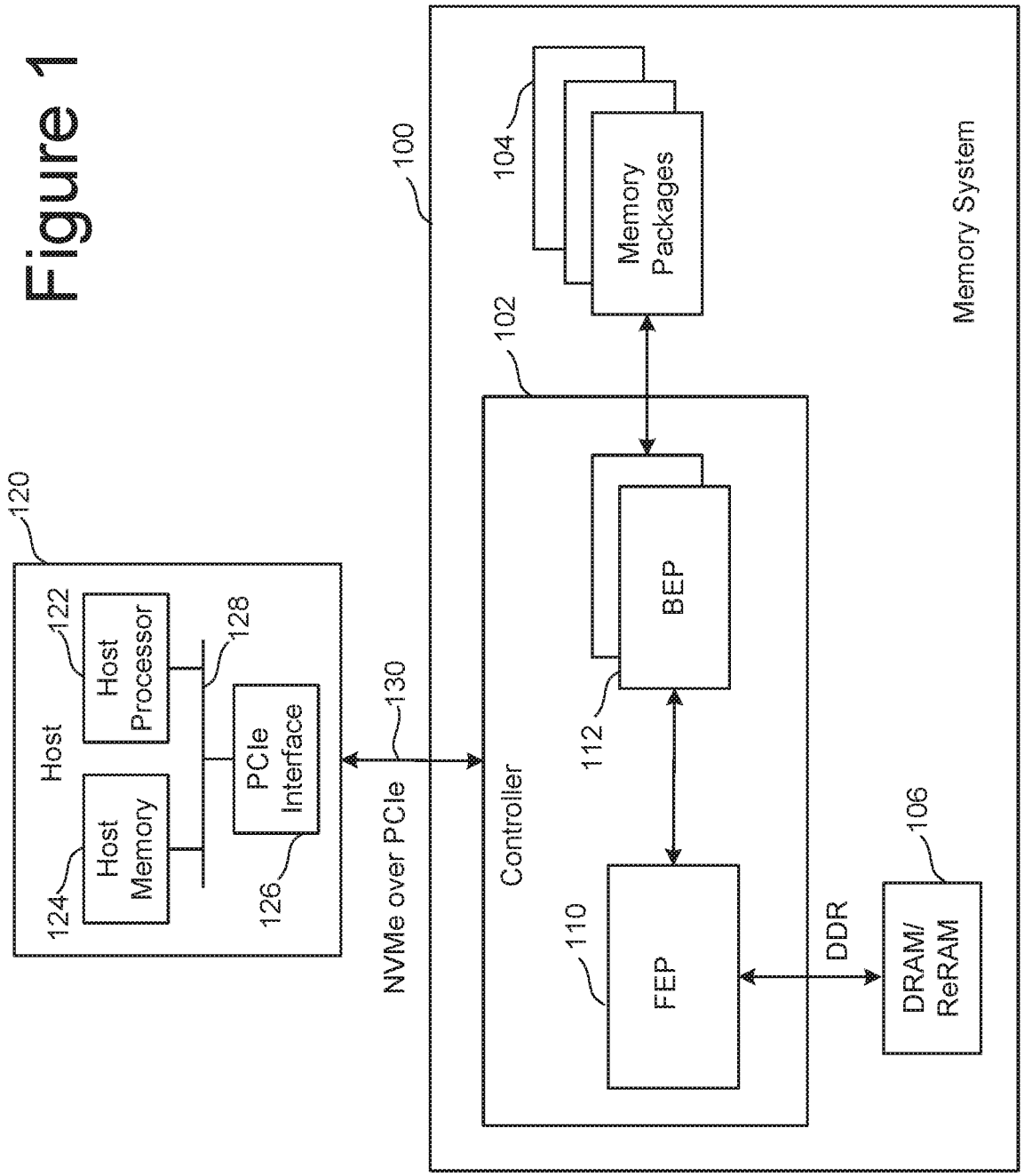
FIG. 1 is a block diagram of one embodiment of a memory system connected to a host.

To reduce the computational complexity and relax the memory requirements of neural networks, Binary Neural Networks (BNNs) have been introduced. In BNNs, the weights and inputs of the neural network are truncated into binary values (−1, +1) and the binary arithmetic simplifies multiplication and addition to XNOR and bit-count operations. The following disclosure presents techniques for exploiting the structure of NAND memory for the storage of the weights of binary neural networks and for the execution of the multiply-and-accumulation operations within the NAND memory.

Each binary weight is stored in a unit synapse formed of a pair of series connected binary memory cells, such as a pair of adjacent memory cells on a NAND string, where one of the memory cells is in a programmed state and the other in an erased state. Depending on which memory cell of the unit synapse is in the programmed and which memory cell is in the erased state, the unit synapse will either be in the −1 or +1 weight. The binary input is then applied as a voltage pattern on the corresponding word lines, in which one of the word line pair is at a read voltage (for which only the erased state memory cell will conduct) and the other one of the word line pair is at a pass voltage (for which a memory cell in either state will conduct). Depending on which word line of the word line pair is at which value, the input will either be a −1 or +1 input. By applying the input to the word line pair, the unit synapse (and corresponding NAND string) will either conduct or not, depending whether or not the input and the weight match. The result can be determined by a sense amplifier connected to a corresponding bit line. By sequentially working through the input/unit synapse pairs along a NAND string and accumulating the results of the sense amplifier, the multiply-and accumulate operations of propagating an input through a layer of a neural network can be performed. As the word lines of the array span multiple NAND strings, the operation can be performed concurrently for the binary weights of multiple unit synapse.

The degree of parallelism can be increased by the introduction of multi-bit sense amplifiers, so that the unit synapse from different memory blocks of the array can be sensed concurrently. Further increases in parallelism can be obtained by concurrent sensing on multiple planes and pipelining the output of one plane, corresponding to one layer of a neural network, to be the input of another plane, corresponding to the subsequent layer of a neural network.

The accuracy of a binary weight neural network can be increased through use of a ternary-binary network (TBN). In a TBN arrangement, the weight values are binary (−1, +1), but the inputs are now ternary (−1, 0, +1). As in the BNN case, the weights can still be stored in a unit synapse formed of a pair of series connected memory cells. The 0 input value can be implemented as a voltage pattern where both word lines of the word line pair are at the read voltage (for which only the erased state memory cell will conduct). To account for such 0 input values, logic circuitry can determine when the voltage levels of a word line pair match and adjust the count accumulated from the sense amplifiers accordingly.

The accuracy of a binary weight neural network can also be increased through use of three valued ternary weights, which can be used with ternary inputs as a ternary input, ternary weight neural network (TTN). A two cell unit synapse in a NAND string can store weight values that are now ternary (−1, 0, +1), where for all input values the unit synapse will conduct for the 0 weight value. The number of zero-weights is maintained in a register and, when performing multiply and accumulate operations, the count accumulated from the sense amplifiers is adjusted to properly account for such weights.

FIG. 1 is a block diagram of one embodiment of a memory system 100 connected to a host 120. Memory system 100 can implement the technology proposed herein, where the neural network inputs or other data are received from the host 120. Depending on the embodiment, the inputs can be received from the host 120 and then provided to the memory packages 104 for inferencing on the weights previously programmed into the memory arrays of the memory packages 104. Many different types of memory systems can be used with the technology proposed herein. Example memory systems include solid state drives ("SSDs"), memory cards and embedded memory devices; however, other types of memory systems can also be used.

Memory system 100 of FIG. 1 comprises a Controller 102, non-volatile memory 104 for storing data, and local memory (e.g. DRAM/ReRAM) 106. Controller 102 comprises a Front End Processor (FEP) circuit 110 and one or more Back End Processor (BEP) circuits 112. In one embodiment FEP circuit 110 is implemented on an ASIC. In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the Controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126 connected along bus 128. Host memory 124 is the host's physical memory, and can be DRAM, SRAM, non-volatile memory or another type of storage. Host 120 is external to and separate from memory system 100. In one embodiment, memory system 100 is embedded in host 120.

Figure 2:
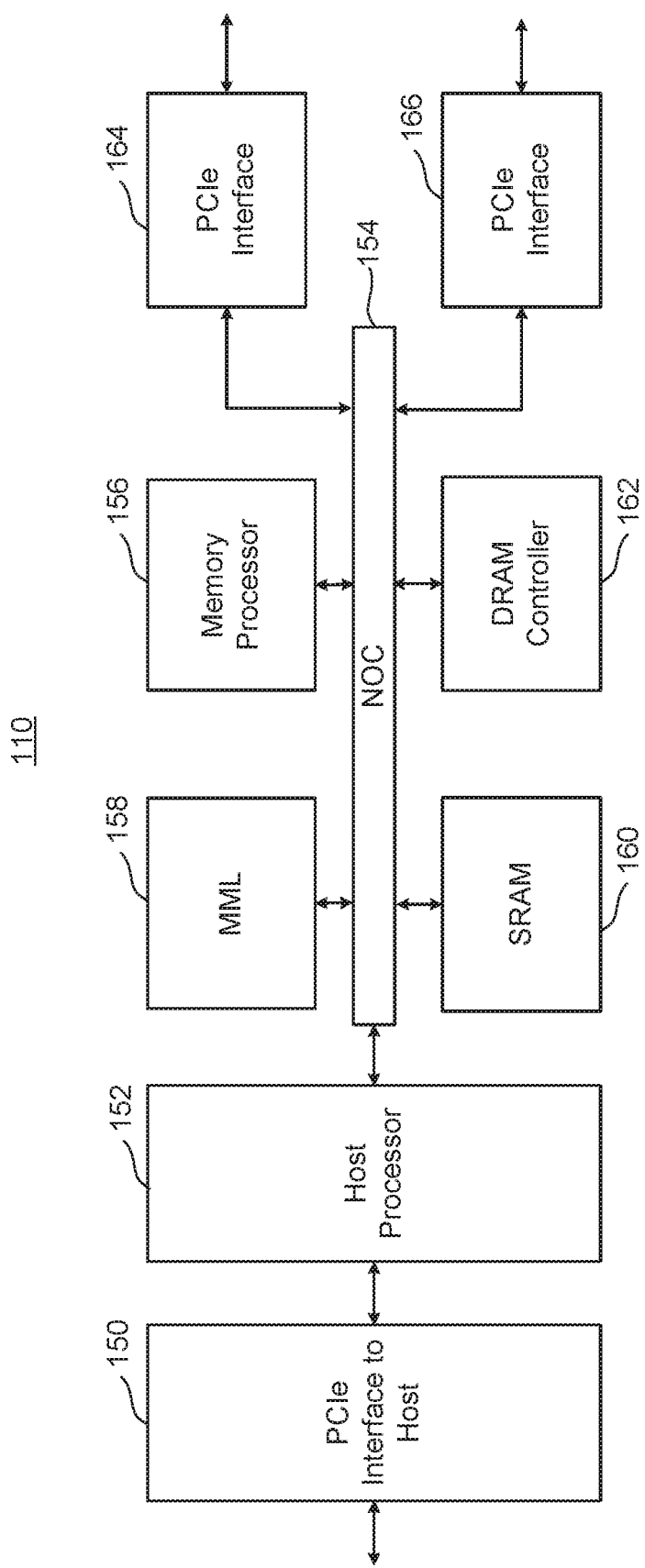
FIG. 2 is a block diagram of one embodiment of a Front End Processor Circuit. In some embodiments, the Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Flash Translation Layer (FTL) or, more generally, a Media Management Layer (MML) 158 that performs memory management (e.g., garbage collection, wear leveling, load balancing, etc.), logical to physical address translation, communication with the host, management of DRAM (local volatile memory) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure (e.g., 326 of FIG. 5 below) of a die. The MML 158 may be needed because: 1) the memory may have limited endurance; 2) the memory structure may only be written in multiples of pages; and/or 3) the memory structure may not be written unless it is erased as a block. The MML 158 understands these potential limitations of the memory structure which may not be visible to the host. Accordingly, the MML 158 attempts to translate the writes from host into writes into the memory structure.

Figure 3:
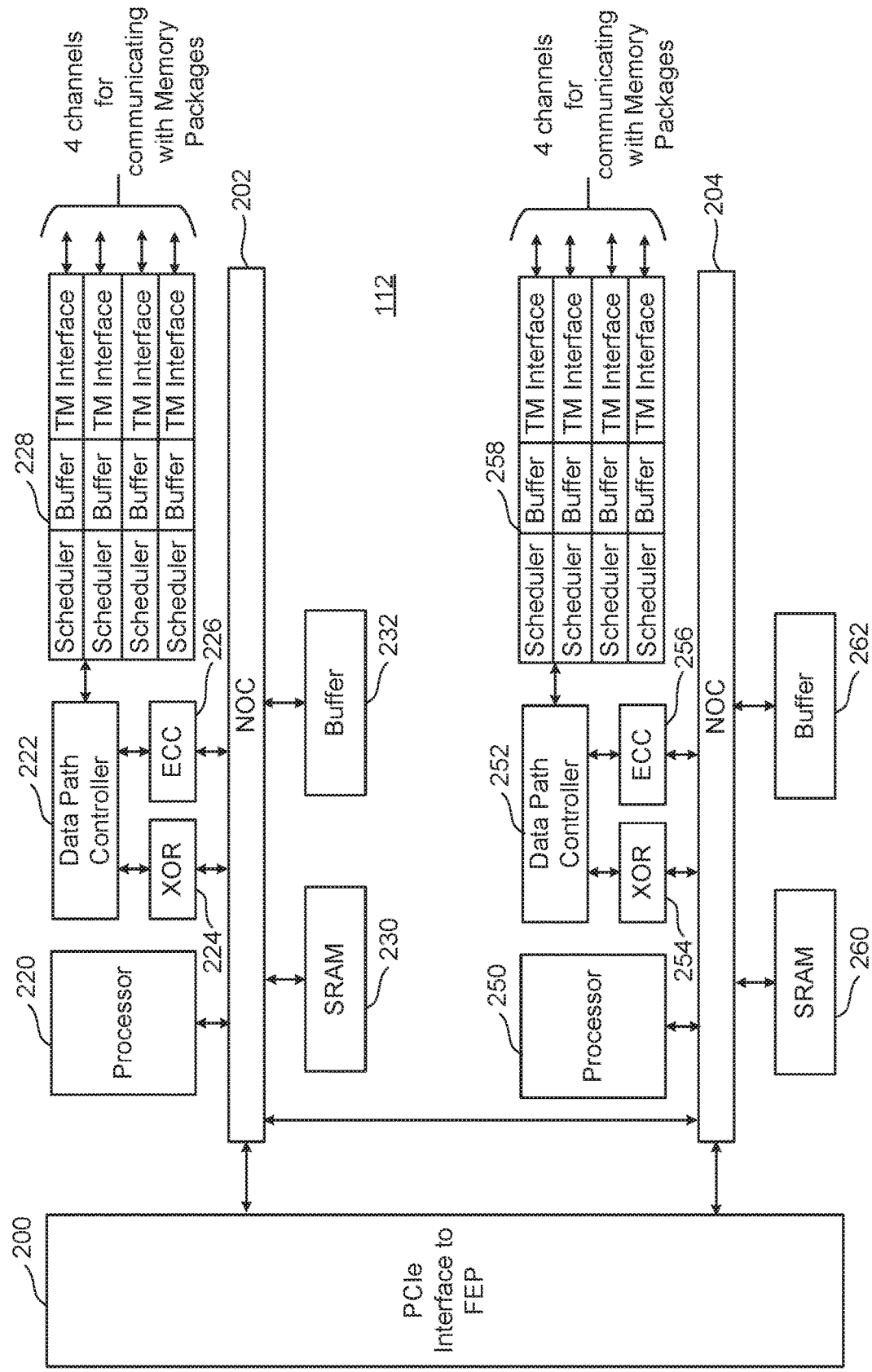
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
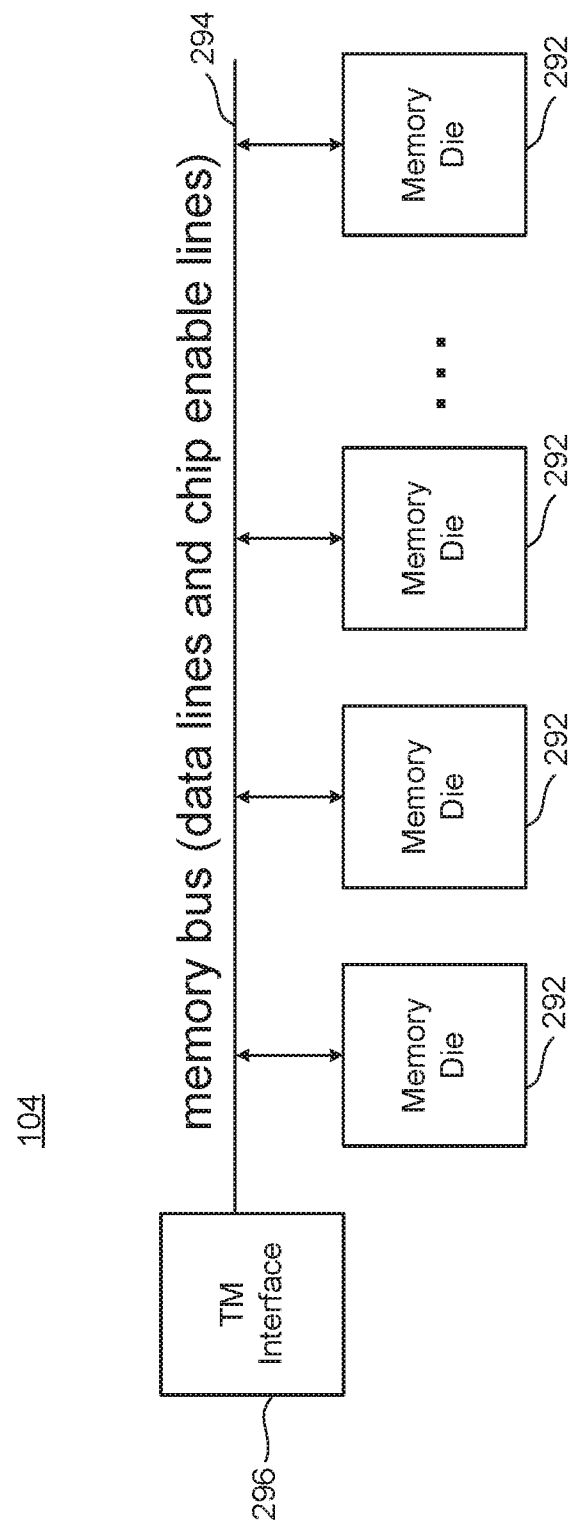
FIG. 4 is a block diagram of one embodiment of a memory package.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
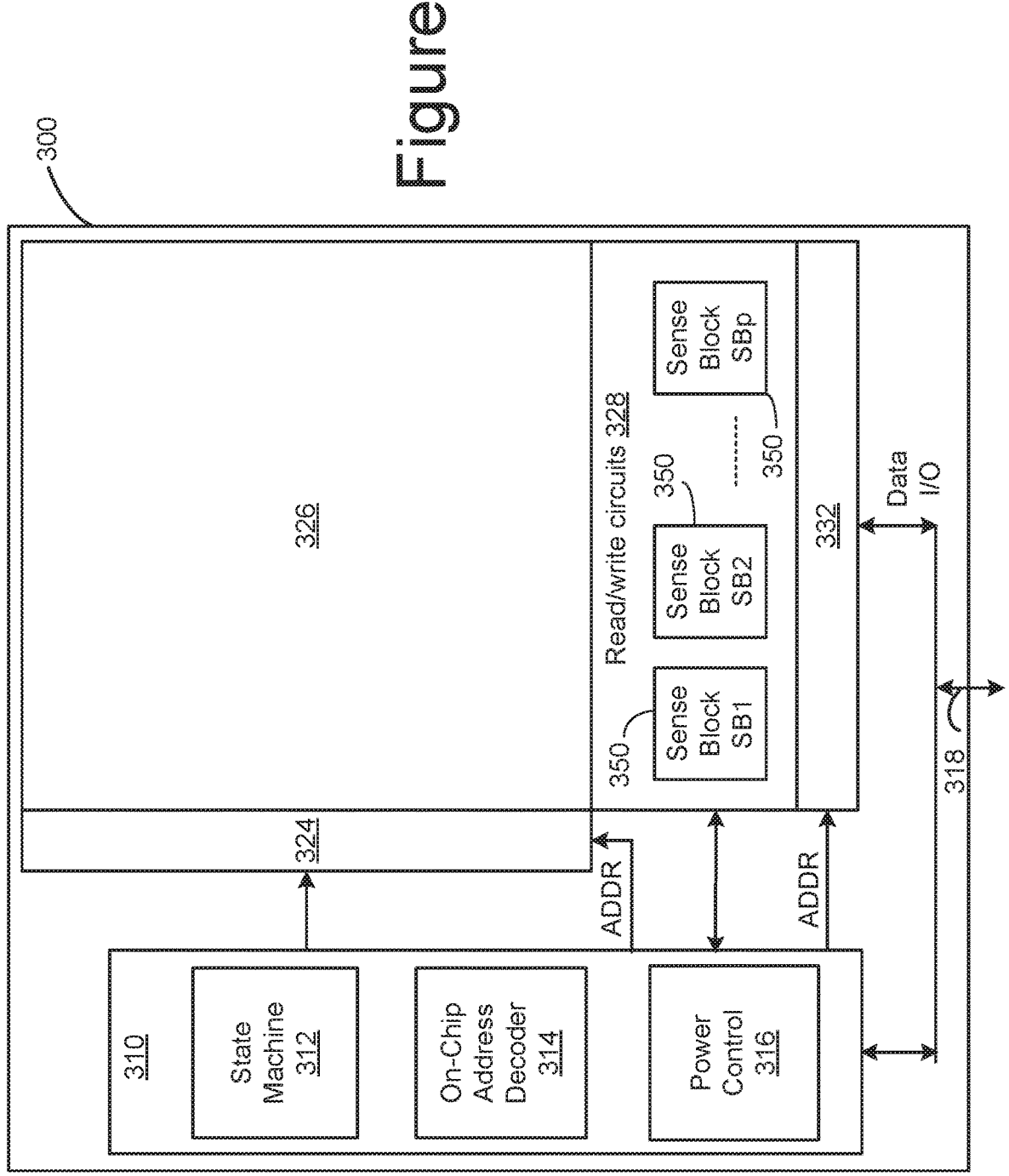
FIG. 5 is a block diagram of one embodiment of a memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 126 is addressable by word lines via a row decoder 324 and by bit lines via a column decoder 332. The read/write circuits 328 include multiple sense blocks 350 including SB1, SB2, SBp (sensing circuitry) and allow a page of memory cells to be read or programmed in parallel. Commands and data are transferred between the Controller and the memory die 300 via lines 318. In one embodiment, memory die 300 includes a set of input and/or output (I/O) pins that connect to lines 318.

Control circuitry 310 cooperates with the read/write circuits 328 to perform memory operations (e.g., write, read, and others) on memory structure 326, and includes a state machine 312, an on-chip address decoder 314, and a power control circuit 316. State machine 312 provides die-level control of memory operations. In one embodiment, state machine 312 is programmable by software. In other embodiments, state machine 312 does not use software and is completely implemented in hardware (e.g., electrical circuits). In another embodiment, state machine 312 is replaced by a micro-controller. In one embodiment, control circuitry 310 includes buffers such as registers, ROM fuses and other storage devices for storing default values such as base voltages and other parameters.

The on-chip address decoder 314 provides an address interface between addresses used by Controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

For purposes of this document, the phrase "one or more control circuits" refers to a controller, a state machine, a micro-controller and/or control circuitry 310, or other analogous circuits that are used to control non-volatile memory.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 6:
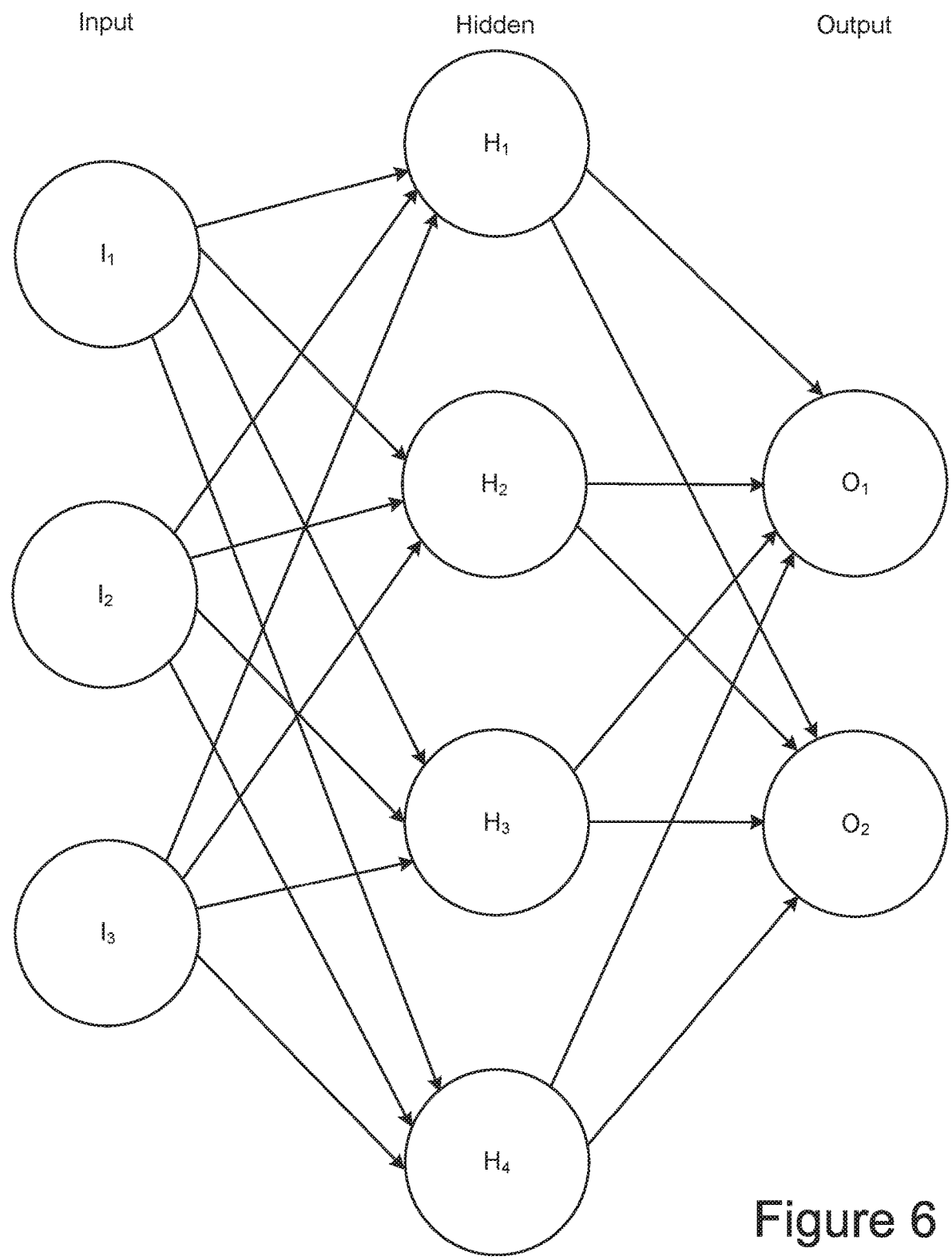
FIG. 6 illustrates a simple example of an artificial neural network.

Turning now to types of data that can be stored on non-volatile memory devices, a particular example of the type of data of interest in the following discussion is the weights used is in deep neural networks. An artificial neural network is formed of one or more intermediate layers between an input layer and an output layer. The neural network finds a mathematical manipulation to turn the input into the output, moving through the layers calculating the probability of each output. FIG. 6 illustrates a simple example of an artificial neural network.

In FIG. 6 an artificial neural network is represented as an interconnected group of nodes or artificial neurons, represented by the circles, and a set of connections from the output of one artificial neuron to the input of another. The example shows three input nodes ($I_1$, $I_2$, $I_3$) and two output nodes ($O_1$, $O_2$), with an intermediate layer of four hidden or intermediate nodes ($H_1$, $H_2$, $H_3$, $H_4$). The nodes, or artificial neurons/synapses, of the artificial neural network are implemented by logic elements of a host or other processing system as a mathematical function that receives one or more inputs and sums them to produce an output. Usually each input is separately weighted and the sum is passed through the node's mathematical function to provide the node's output.

In common artificial neural network implementations, the signal at a connection between nodes (artificial neurons/synapses) is a real number, and the output of each artificial neuron is computed by some non-linear function of the sum of its inputs. Nodes and their connections typically have a weight that adjusts as a learning process proceeds. The weight increases or decreases the strength of the signal at a connection. Nodes may have a threshold such that the signal is only sent if the aggregate signal crosses that threshold. Typically, the nodes are aggregated into layers. Different layers may perform different kinds of transformations on their inputs. Signals travel from the first layer (the input layer), to the last layer (the output layer), possibly after traversing the layers multiple times. Although FIG. 6 shows only a single intermediate or hidden layer, a complex deep neural network (DNN) can have many such intermediate layers.

An artificial neural network is "trained" by supplying inputs and then checking and correcting the outputs. For example, a neural network that is trained to recognize dog breeds will process a set of images and calculate the probability that the dog in an image is a certain breed. A user can review the results and select which probabilities the network should display (above a certain threshold, etc.) and return the proposed label. Each mathematical manipulation as such is considered a layer, and complex neural networks have many layers. Due to the depth provided by a large number of intermediate or hidden layers, neural networks can model complex nonlinear relationships as they are trained.

Figure 7B:
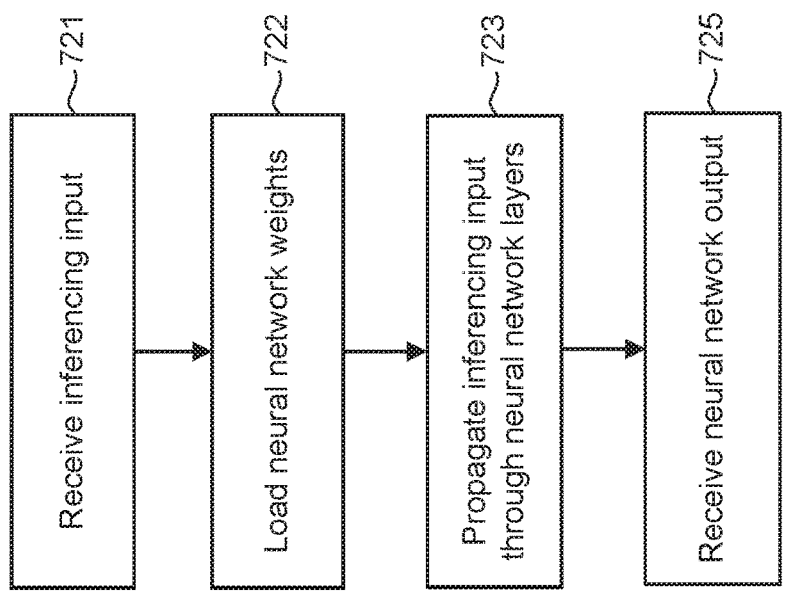
FIG. 7B is a flowchart describing one embodiment of a process for inference using a neural network.
Figure 7A:
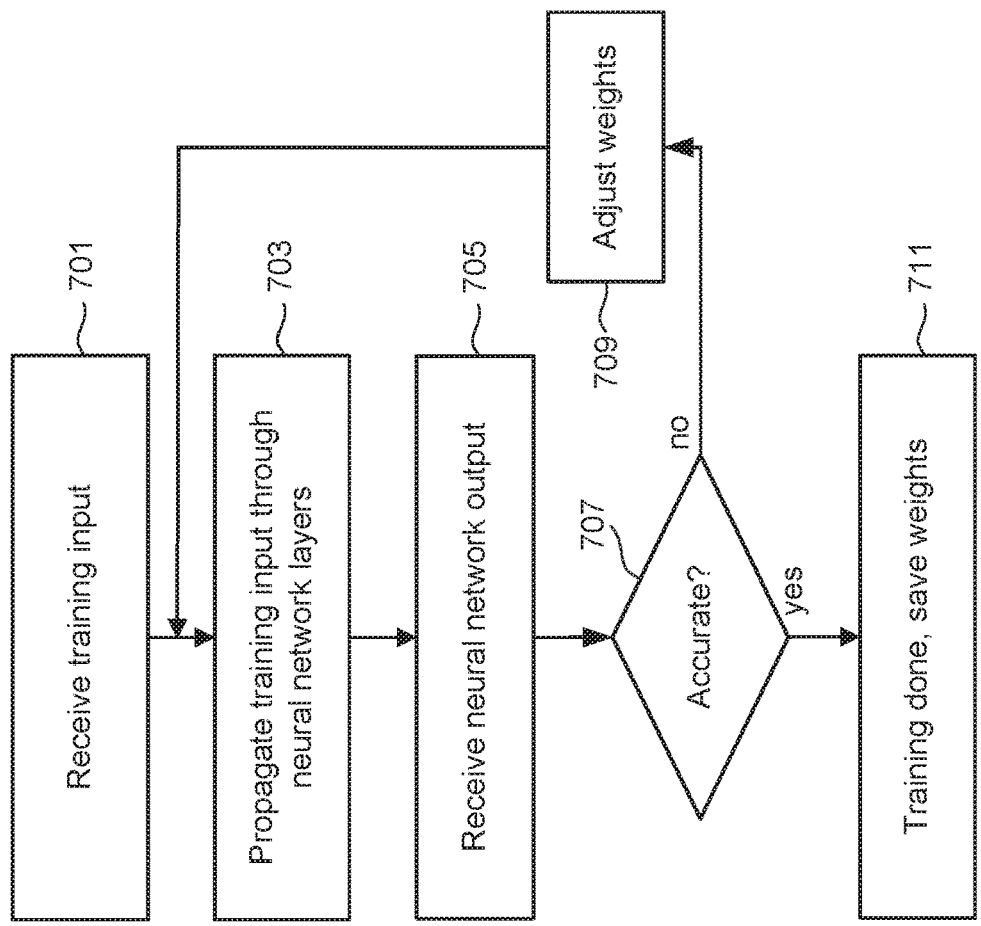
FIG. 7A is a flowchart describing one embodiment of a process for training a neural network to generate a set of weights.

FIG. 7A is a flowchart describing one embodiment of a process for training a neural network to generate a set of weights. The training process is often performed in the cloud, allowing additional or more powerful processing the accessed. At step 701, the input, such as a set of images, is received at the input nodes (e.g., $I_1$, $I_2$, $I_3$ in FIG. 6). At step 703 the input is propagated through the nodes of the hidden intermediate layers (e.g., $H_1$, $H_2$, $H_3$, $H_4$ in FIG. 6) using the current set of weights. The neural network's output is then received at the output nodes (e.g., $O_1$, $O_2$ in FIG. 6) in step 705. In the dog breed example of the preceding paragraph, the input would be the image data of a number of dogs, and the intermediate layers use the current weight values to calculate the probability that the dog in an image is a certain breed, with the proposed dog breed label returned at step 705. A user can then review the results at step 707 to select which probabilities the neural network should return and decide whether the current set of weights supply a sufficiently accurate labelling and, if so, the training is complete (step 711). If the result is not sufficiently accurate, the neural network adjusts the weights at step 709 based on the probabilities the user selected, followed by looping back to step 703 to run the input data again with the adjusted weights. Once the neural network's set of weights have been determined, they can be used to "inference," which is the process of using the determined weights to generate an output result from data input into the neural network. Once the weights are determined at step 711, they can then be stored in non-volatile memory for later use, where the storage of these weights in non-volatile memory is discussed in further detail below.

FIG. 7B is a flowchart describing a process for the inference phase of supervised learning using a neural network to predict the "meaning" of the input data using an estimated accuracy. Depending on the case, the neural network may be inferenced both at cloud and by an edge device's (e.g., smart phone, automobile process, hardware accelerator) processor. At step 721, the input is received, such as the image of a dog in the example used above. If the previously determined weights are not present in the device running the neural network application, they are loaded at step 722. For example, on a host processor executing the neural network, the weight could be read out of an SSD in which they are stored and loaded into RAM on the host device. At step 723, the input data is then propagated through the neural network's layers. Step 723 will be similar to step 703 of FIG. 7B, but now using the weights established at the end of the training process at step 711. After propagating the input through the intermediate layer, the output is then provided at step 725.

Neural networks are typically feedforward networks in which data flows from the input layer, through the intermediate layers, and to the output layer without looping back. At first, in the training phase of supervised learning as illustrated by FIG. 7A, the neural network creates a map of virtual neurons and assigns random numerical values, or "weights", to connections between them. The weights and inputs are multiplied and return an output between 0 and 1. If the network does not accurately recognize a particular pattern, an algorithm adjusts the weights. That way the algorithm can make certain parameters more influential (by increasing the corresponding weight) or less influential (by decreasing the weight) and adjust the weights accordingly until it determines a set of weights that provide a sufficiently correct mathematical manipulation to fully process the data.

Figure 8:
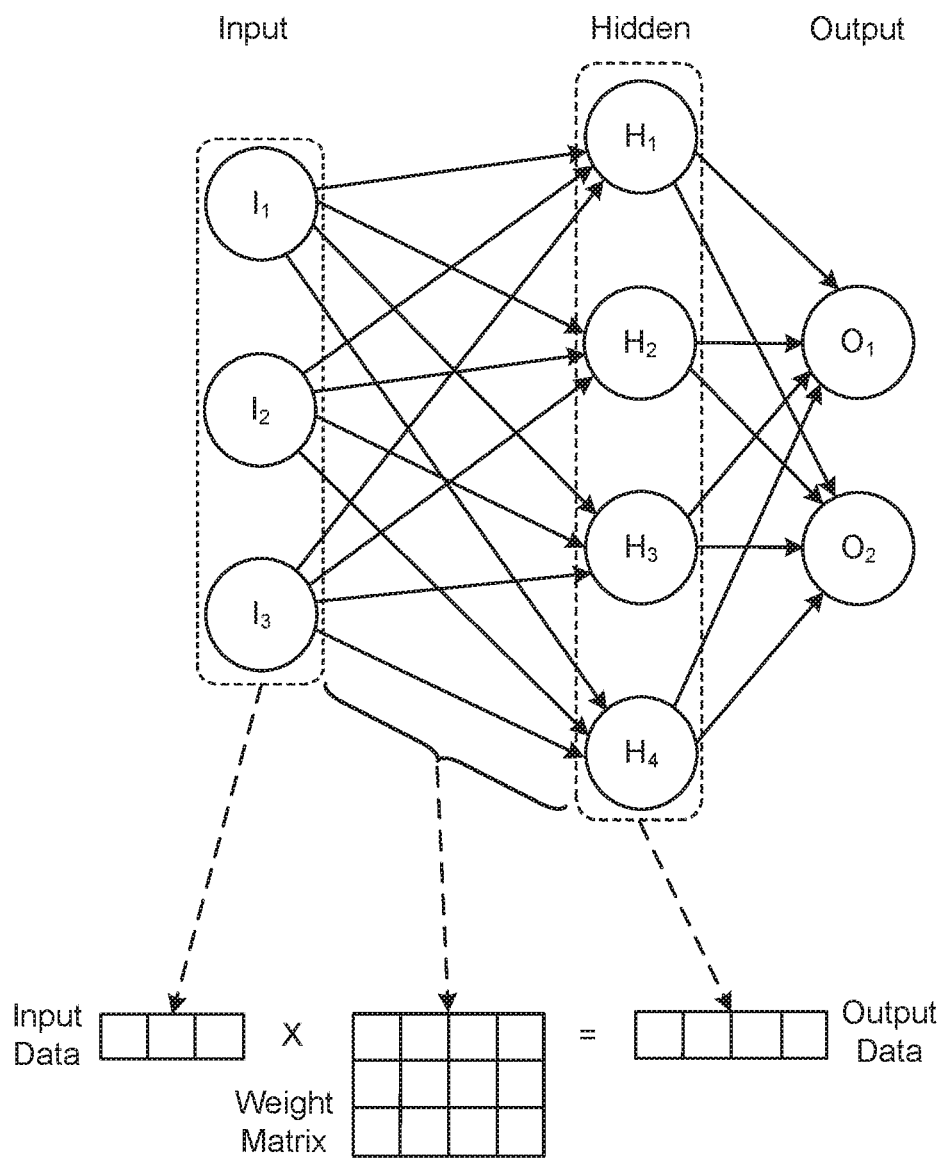
FIG. 8 is a schematic representation of the use of matrix multiplication in a neural network.

FIG. 8 is a schematic representation of the use of matrix multiplication in a neural network. Matrix multiplication, or MatMul, is a commonly used approach in both the training and inference phases for neural networks and is used in kernel methods for machine learning. FIG. 8 at top is similar to FIG. 6, where only a single hidden layer is shown between the input layer and the output layer. The input data is represented as a vector of a length corresponding to the number of input nodes. The weights are represented in a weight matrix, where the number of columns corresponds to the number of the number of intermediate nodes in the hidden layer and the number of rows corresponds to the number of input nodes. The output is determined by a matrix multiplication of the input vector and the weight matrix, where each element of the output vector is a dot product of the vector of the input data with a column of the weight matrix.

A common technique for executing the matrix multiplications is by use of a multiplier-accumulator (MAC, or MAC unit). However, this has a number of issues. Referring back to FIG. 7B, the inference phase loads the neural network weights at step 722 before the matrix multiplications are performed by the propagation at step 723. However, as the amount of data involved can be extremely large, use of a multiplier-accumulator for inferencing has several issues related to loading of weights. One of these is high energy dissipation due to having to use large MAC arrays with the required bit-width. Another is high energy dissipation due to the limited size of MAC arrays, resulting in high data movement between logic and memory and an energy dissipation that can be much higher than used in the logic computations themselves.

To help avoid these limitations, the use of a multiplier-accumulator array can be replaced with other memory technologies. For example, the matrix multiplication can be computed within a memory array by leveraging the characteristics of Storage Class Memory (SCM), such as those based on ReRAM, PCM, or MRAM based memory cells. This allows for the neural network inputs to be provided via read commands and the neural weights to be preloaded for inferencing. By use of in-memory computing, this can remove the need for logic to perform the matrix multiplication in the MAC array and the need to move data between the memory and the MAC array.

The following considers embodiments based on memory arrays using NAND type of architectures, such as flash NAND memory using memory cells with a charge storage region. Flash NAND memory can be implemented using both multi-level cell (MLC) structures and single-level cell (SLC) structures, where the following mainly considers embodiments based on SLC Flash memory. In contrast to MAC array logic, use of SLC Flash memory shows several advantages, including a much higher area/bit value, a much higher throughput rate, and a significant reduction in energy dissipation due to minimizing data movement by performing in-array multiplication. Additionally, the NAND flash structure is highly scalable, supporting deep and wide neural networks.

A technique that can be used to reduce the computational complexity of the inference process is by use of a Binarized Neural Network (BNN), in which a neural network works with binary weights and activations. A BNN (also called an XNOR-Net) computes the matrix-vector multiplication with "binary" inputs {−1, 1} and "binary" weights {−1, 1}. FIG. 9 is a table illustrating the output of a binary neural network in response to the different input-weight combinations. As shown in the right-most column, when the input and weight match, the output is 1; and when the input and the weight differ, the output is −1. FIGS. 10-13 illustrate an embodiment for the realization of a neural network with binary-input and binary-weights in an SLC NAND array.

FIG. 10 illustrates an embodiment for a unit synapse cell for storing a binary weight in a pair of series connected memory cells FG1 and FG2. In this example, each of the memory cells are SLC cells storing one of two states and can be part of a larger NAND string. The memory cells FG1 and FG2 can be flash memory cells and are programmed or erased by respectively adding or removing electrons from a charge storing layer or a floating gate, and are sensed by applying corresponding voltages V1 and V2 to their control gates. When the memory cells FG1 and FG2 are part of a larger NAND string that includes additional unit synapse cells or other memory cells, the pair of memory cells can be adjacent on the NAND string or separated by other memory cells forming the NAND string. In the following discussion, the individual memory cells of a unit synapse cell will be represented as being adjacent, but other arrangement are possible depending on the embodiment. For example, the upper half of a NAND string could hold the first memory cell of each unit synapse, with the second memory cell of each unit synapse in the lower half of the NAND string. For any of these arrangements, when sensing a given unit synapse, the other memory cells and select gates on the same NAND string will be biased such that both of the memory cells of the non-selected unit synapses and any other memory cells, along with the select gates, are conducting.

FIG. 11 illustrates the distribution of threshold voltages for the storage of data states on an SLC memory. In this embodiment, the erased negative threshold state is taken as the "1" state and the positive threshold state is taken as the "0". FIG. 10 illustrates a typically distribution of the threshold voltage of the memory cells of a set of memory cells, such as an erase block or whole array, after the memory cells have been erased (here assigned the "1" state) and the memory cells to programmed to the positive threshold states (here assigned the "0" state). As discussed further with respect to FIGS. 12 and 13, a binary weight will have one memory cell of a unit synapse in the "0" state and the other memory cell in the "1" state. More generally, the "1" state need not be a negative threshold state as long as the two states correspond to a lower threshold state, here defined as the "1" state, and a higher threshold state, here defined as the "0" state.

For sensing the memory cells with the threshold distribution illustrated in FIG. 11, a first voltage level Vread is used to distinguish between the data states, so that if applied to the control gate of a memory cell, the memory cell will conduct if in the "1" state and not conduct if in the "0" state. For example, if the "1" states are a negative threshold voltage state and the "0" states are a positive threshold voltage state, Vread could be taken as 0V. A second sensing voltage Vpass is high enough such that a memory cell in either state will conduct. For example, Vpass could be a few volts. In the following, Vread will be defined as the "0" input voltage value and Vpass will be defined as the "1" input voltage value.

In implementations of NAND flash memory, a number of different voltage levels are often used for sensing operations, both in program verify and read operations, for both SLC and MLC memory. For example, a program verify level for a given data state may be offset from the read voltage level for the same data state. Also, various levels may be used for pass voltages in different operations and conditions to place a memory cell in a conducting state independently of its stored data state. To simply the following discussion, only the single Vread voltage will be used to differentiate between the data states and only the single Vpass voltage will be used when a memory cell or select gate is to be put into a conducting state for all stored data state values.

Figure 12:
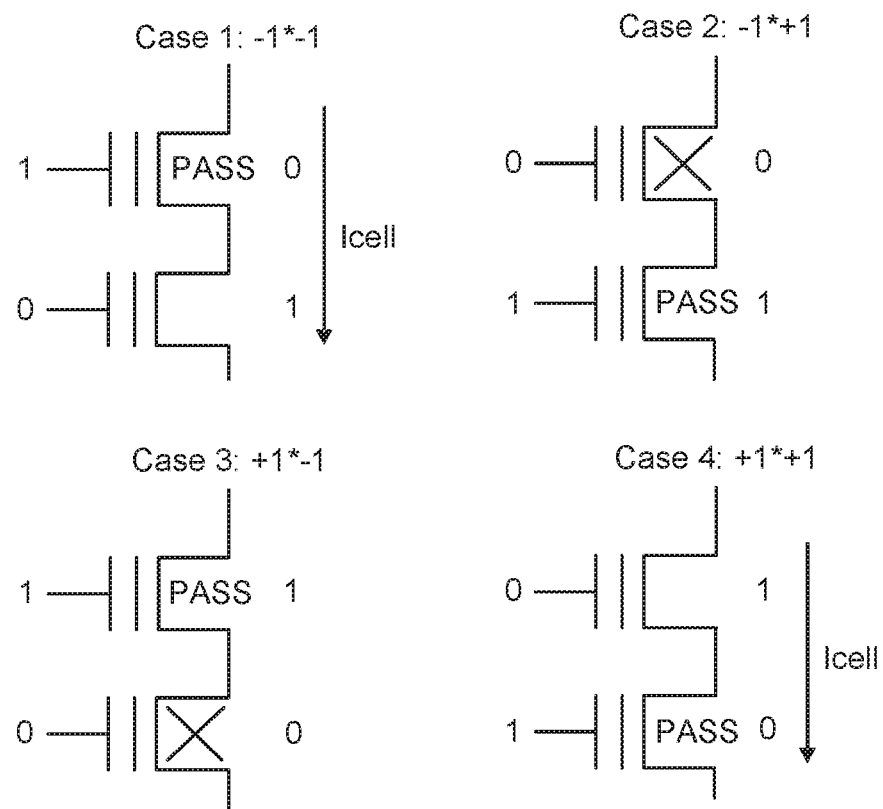

FIGS. 12 and 13 illustrate an embodiment for implementing a binary neural network using a pair of series connected SLC memory cells as a unit synapse. More specifically, FIG. 13 shows one embodiment for the correspondence between input logic, weight logic, and output logic of FIG. 9 and the input voltage patterns, threshold voltage Vth of the unit synapse's memory cells, and the output voltage, respectively. FIG. 12 is a schematic representation of the response of a unit synapse to the different cases.

In FIGS. 12 and 13, a logic input of −1 corresponds to the input voltage pattern of V1=Vpass="1", V2=Vread="0"; and a logic input of +1 corresponds to the input voltage pattern of V1=Vread="0", V2=Vpass="1". A weight logic of −1 corresponds to the memory cell FG1 being in the "0" (programmed) state and FG2 being in the "1" (erased state); and a weight logic of +1 corresponds to the memory cell FG1 being in the "1" state and FG2 being in the "0". An output logic of +1 corresponds to the unit synapse conducting a current Icell, resulting in an output voltage drop of ΔV across the unit synapse; and an output logic of −1 corresponds to the unit synapse not conducting, resulting in little or no output voltage drop across the unit synapse.

FIG. 12 schematically represents the four cases of input, weight pairs. In case 1, the input and weight both match with values of −1. The applied input voltage pattern applies the higher input voltage of Vpass, or "1", to upper cell with the higher Vth "0" data state and the lower input voltage of Vread, or "0", to the lower cell with the lower Vth "1" data state, so that cells are conductive and pass a current of I cell. In case 2, the input voltage pattern is reversed with respect to case 1, with the input logic is now at +1 while the weight is at −1. This results in the lower Vpass, or "0", voltage level applied to the top cell in higher Vth, which consequently will not be conductive (as indicated by the X under the memory cell) and no appreciable current will flow thought the pair.

For cases 3 and 4 on the bottom of FIG. 12, the weight value is now +1, with the lower Vth "1" state in the upper cell and the upper Vth "0" programmed into the lower cell. In case 3, the −1 input voltage pattern is applied to the unit synapse, resulting the lower cell not conducting as it receives the lower Vread, or "0", voltage level. In case 4, the higher Vpass, or "1" input is now applied to the lower memory cell, which consequently conducts, and the unit synapse passes the current Icell.

As represented in the embodiment of FIGS. 12 and 13, the use of a pair of series connected memory cells of FIG. 10 as a unit synapse can be used to implement the binary neural network logic table of FIG. 9. The unit synapses can be incorporated into larger NAND strings of multiple such series connected unit synapses. When sensing a selected unit synapse on a NAND string, other unit synapses on the same NAND string can be biased to be on by using a Vpass voltage, with the NAND stings select gates also biased to be on.

The use of NAND flash memory to store weight and compute the dot products of inputs and weights in-array can be used in both the training and inference phases. The training phase can proceed as in the flow of FIG. 7A, where step 709 would erase and reprogram the weights as needed to adjust the weights until determined to be sufficiently accurate at step 707. The present discussion will mostly focus on the inference phase, where the weights have previously been determined in a training process and then loaded into a NAND memory by programming of the unit synapses to the determined binary weight values.

Figure 14:
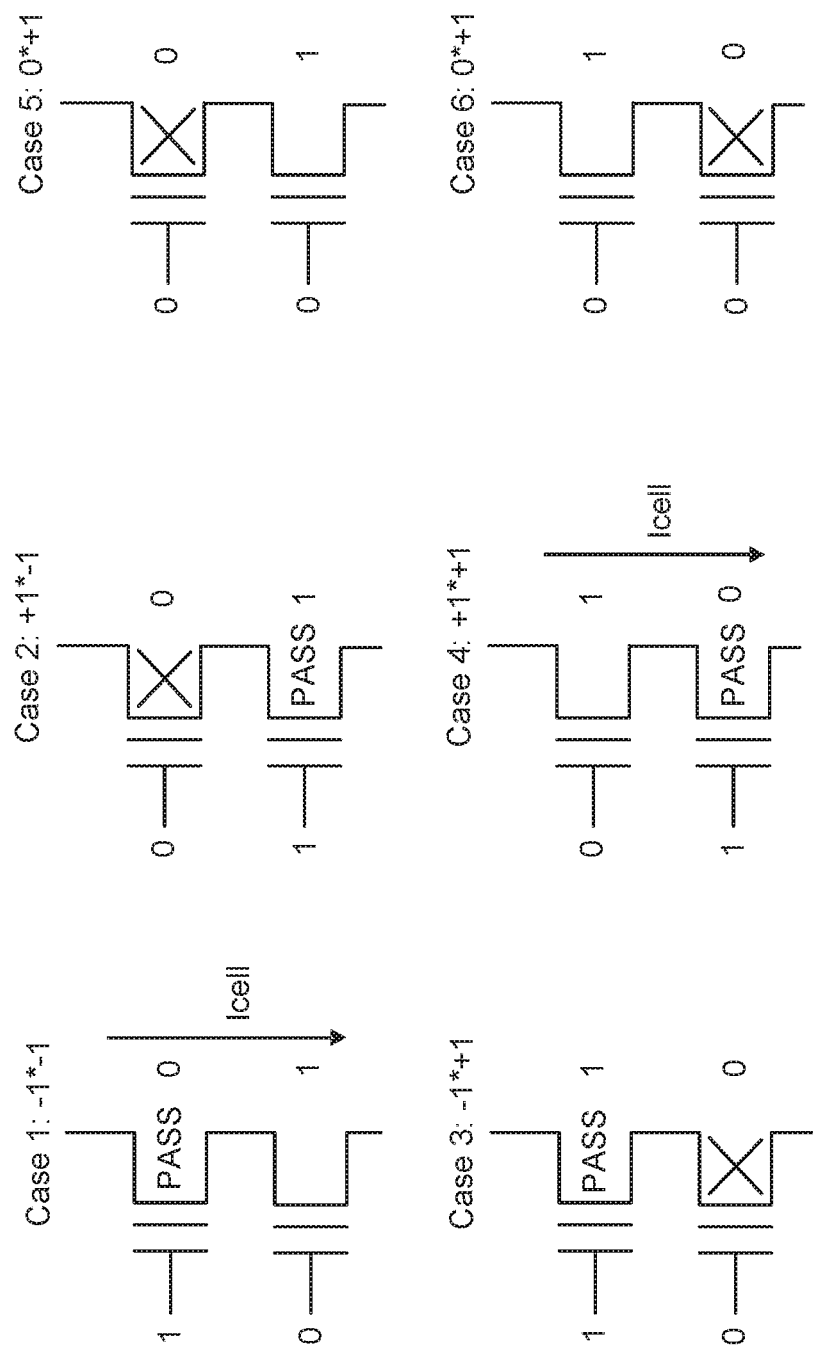

One technique for improving the accuracy of a binary weight neural network is through use of a 3 value, or ternary, in a Ternary inputs and Binary weights Neural (TBN) network. In such a TBN network, the logic table of FIG. 9 still holds for the −1 and +1 inputs, but is now extended to include a third input value of "0", for which the output is now weight independent and "−1" for either of the weight values. FIGS. 14 and 15 respectively correspond to FIGS. 12 and 13 as extended to include a "0" input logic value as cases 5 and 6. As the weights are still binary, the unit synapse and the assignment of data state and input voltages can be the same as illustrated in FIGS. 10 and 11.

In the table of FIG. 15, the top four lines for cases 1-4 are the same as for FIG. 13, but extended to include a "0" input logic value for implementing a ternary input. Cases 5 and 6 respectively correspond to weight logic values −1 and +1, but now with an input logic value of "0". The binary weight values are implemented in the unit synapse as before, but the input logic "0" is implemented by applying the low input voltage of Vread, or "0", to the control gates of both memory cells of the unit synapse. This is represented schematically in FIG. 14.

FIG. 14 repeats cases 1-4 from FIG. 12 and adds in cases 5 and 6. As illustrated for case 5, as Vread, or "0", is applied to both control gates and the top memory cell for weight −1 is programmed to the high Vth "0" data state, the unit synapse will not conduct, as represented by the X under the non-conducting memory cell. For case 6, for weight +1 the lower memory cell of the unit synapse is programmed to the high Vth "0" data state and the unit synapse will again not conduct, as represented by the X. This is represented in FIG. 15 where both cases 5 and 6 have an output logic of −1, corresponding to no discharged current and no output voltage drop.

Figure 16:
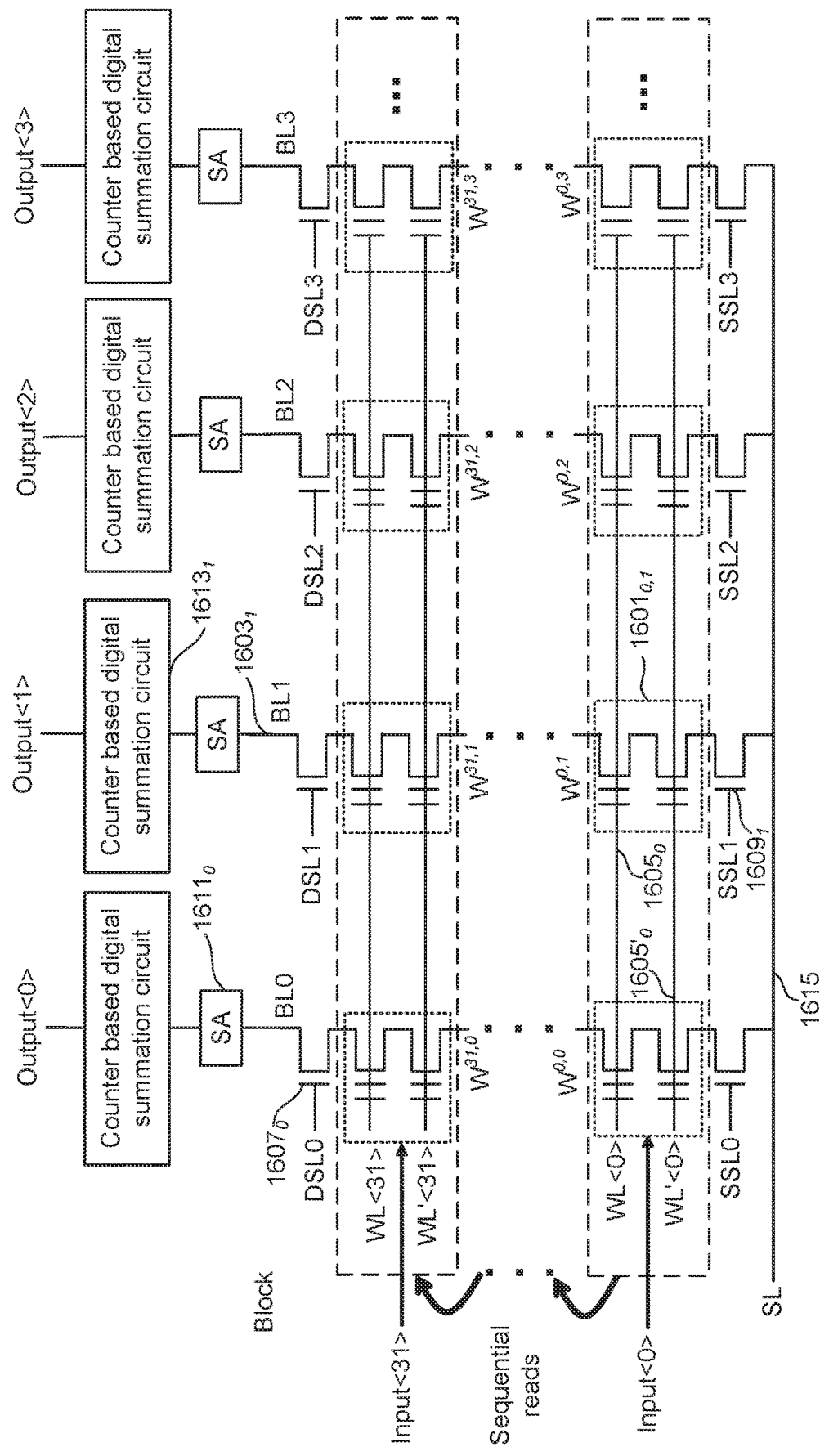
FIG. 16 illustrates the incorporation of the unit synapses into a NAND array.

FIG. 16 illustrates the incorporation of the unit synapses into a NAND array, such as in the memory structure 326 of FIG. 5. FIG. 16 shows one block of what can be a larger array of many blocks, each with multiple NAND strings connected between a source line 1615 and a corresponding bit line BLi 1603$i$. A typical NAND memory array will be formed of many such memory blocks. Each NAND string is formed of a number of series memory cells connected in series between a source side select gate SSLi 1609$i$, by which the NAND string is connected to the source line 1615, and a drain side select gate DSLi 1607$i$, by which the NAND string is connect to the corresponding bit line BLi 1603$i$.

The memory cells along each NAND string are paired into unit synapses of a pair of memory cells storing a weight $W^{i,j}$, as illustrated by the unit synapse of FIG. 10. Each of the NAND strings can have one or more unit synapse connected in series, where the embodiment of FIG. 16 illustrates 32 unit synapses per NAND string. Each unit synapse can store a binary weight and is connected along a pair of word lines WL<j> 1605$j$ and WL'<j> 1605'$j$ that receive a corresponding logic input Input<j> corresponding to the voltages of FIG. 13 for the binary input case and of FIG. 15 for ternary input case. The word line pairs WL<j> 1605$j$ and WL'<j> 1605'$j$ span the columns of NAND strings of the block. In the embodiment of FIG. 16, the memory cells of a unit synapse are adjacent on the NAND string, but other arrangements can be used such that the memory cells of the synapses are interleaved rather than being contiguous; and although the discussion here is focused on binary weights using two SLC memory cells per synapse, other embodiments can use more memory cells per unit synapse, multi-level memory cells, or both, to store neural network weights with more than the two values of the binary example. Additionally, although the NAND strings in the shown embodiment are formed of charge storing, flash memory cells, other memory cells with the same array architecture can also be used.

The determination of the output of a unit synapse 1601$i,j$ storing weight $W^{i,j}$ can be determined by applying an input logic voltage pattern to the corresponding input to Input<j>, while the other memory cells and select gates of the selected NAND string are biased to be ON. Based on the input logic and weight logic, the unit synapse storing 1601$i,j$ weight $W^{i,j}$ will either conduct or not, as represented in the table of FIG. 15, which can be determined by the corresponding sense amplifier SAi 1611$i$. As discussed further below, for each bit line a corresponding counter-based digital summation circuit CSCi 1613$i$ can keep track of how many of the unit synapses along the bit line conduct in response to the inputs, summing these values, where the sense amplifiers and summation circuits can be part of the Sense Blocks 350 of FIG. 5. The same input Input<j> is applied concurrently to all of the unit synapses 1601$i,j$ storing weight $W^{i,j}$ for all of the bit lines BLi 1603$i$ biasing the select gates of the corresponding select gates SSLi 1609$i$ and DSLi 1607$i$. Consequently, the same input can be applied to multiple synapses concurrently. The different synapses along the NAND strings can selected sequentially for sensing, with the results along each bit line BLi 1603$i$ being accumulated by CSCi 1613$i$. In a NAND memory, a page is the unit of read and program, where the read page and program page are usually taken to be the same, such as the whole of the memory cells connected along a word line or some portion of the memory cells along a common word line. For programming, the data of the unit synapses along a single word line would still be programmed word line by word line; however, relative to a standard NAND memory operation, where the goal to determine the data content of the individual memory cells, the reading of a page of the binary weight unit synapses is performed in word line pairs such that the read page in this case can be taken as corresponding to a word line pair.

The arrangement illustrated by FIG. 16 can used for both binary neural networks (BNNs), where both the weights and inputs are binary, and for ternary-binary neural networks (TBNs), where the weights are binary, but the inputs are ternary. Referring back to FIG. 15, for the ternary input case, however, the output of the sense amplifiers will be the same for both of cases 2 and 5, and will also be the same for cases 3 and 6. As shown by comparing cases 2 and 5, when the weight logic is −1, both the +1 input and the 0 input will result in the unit synapse not conducting so that sense amplifier will see no voltage drop. Similarly, as shown by comparing cases 3 and 6, when the weight logic is +1, both the −1 input and the 0 input will result in the unit synapse not conducting so that sense amplifier will see no voltage drop. Consequently, based solely on the conduction state of the NAND string, the cases 2 and 5 and the cases 3 and 6 cannot be distinguished.

Referring back to FIG. 8, matrix multiplication is a multiple sum-of product (dot-product) calculation for input-weight vector pairs (row-column of input matrixes) used for inferencing in a neural network. FIGS. 17 and 18 consider an example of the computation of a dot-product for the binary neural network algebra and how to implement this using a counter based summation digital circuit for an SLC NAND BNN embodiment. More specifically, although a binary neural network based on the logic illustrated by the table of FIG. 8 is based on the weights, inputs, and outputs as having the values of either +1 or −1, when implemented by a NAND array as illustrate by FIG. 16, a sense amplifier will either register as conducting ("1") or not conducting ("0"). Consequently, for the counter-based digital summation circuits CSCi $1613i$ to accumulate the results to compute the dot-product of the matrix multiplication requires a conversion of the (+1, −1) based values to a (1,0) basis, where the −1 values are replaced by 0.

The table of FIG. 17 considers the dot product of the example of an 8 element binary neural network input vector $I^{bnn}$ across the top row and an 8 element binary neural network weight vector $W^{bnn}$ in the second row when the vector elements are all quantized to −1 1/+1. The third row illustrates the element by element product of $I^{bnn}$ and $W^{bnn}$, equaling +1 when the two match and −1 when these differ. The dot product is then based on summing these bit by bit products to generate the dot-product $P^{bnn\_dec}$ of the two vectors. In decimal system, the final correct result of adding up these values is calculated as $P^{bnn\_dec}=2$.

On the top two rows of the table of FIG. 18, the input vector $I^{bnn}$ and weight vector $W^{bnn}$ are converted into the 1/0 binary basis for the same vectors as in FIG. 17. The third row of FIG. 18 illustrates the corresponding sense amplifier output, being the bit by bit XNOR value of the two vectors, which is 1 when the values match and 0 when the values differ. By accumulating these values from the sense amplifiers SAi $1611i$ in the corresponding summation circuits CSCi $1613i$ to determine their sum, this produces a popcount $CNT^{bnn\_out}$ corresponding to the number 1 values. In the example of FIG. 18, $CNT^{bnn\_out}=5$, which differs from the $P^{bnn\_dec}=2$ value of FIG. 17 as the result of a mismatch in the input and weight is now a 0 rather than a −1.

To correct for this and determine $P^{bnn\_dec}$ in the binary system, a substitution of the output of popcount operand $CNT^{bnn\_out}$ into Eq. 1 can be used to obtain a derived $\underline{P^{bnn\_dec}}$:

$$P^{bnn\_dec}=2*CNT^{bnn\_out}-S, \quad (Eq.\ 1)$$

where S is the size of vector. In this example S=8, so that $P^{bnn\_dec}=2*5-8=2$, which is the exact $P^{bnn\_dec}=2$ for the dot-product of FIG. 17.

Figure 19:
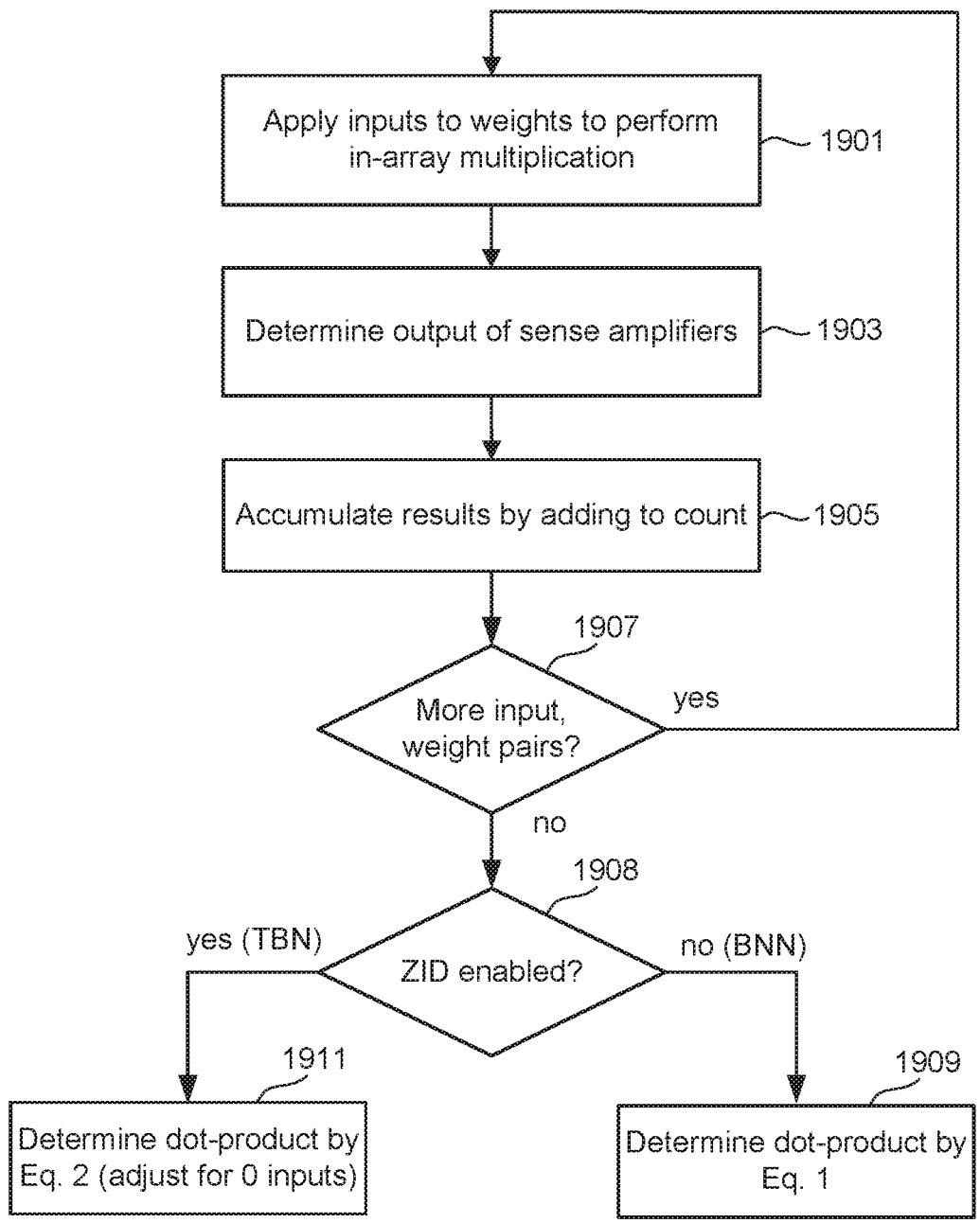
FIG. 19 is a flowchart for one embodiment of a dot-product calculation using a binary neural network in inference.

FIG. 19 is a flowchart for one embodiment of a dot-product calculation using a binary neural network in inference, as illustrated in FIGS. 17 and 18. At step 1901, a first input value is applied to a weight of a first unit synapse to perform an in-array multiplication. Referring back to FIG. 16, this corresponds to applying an Input<j> value to a corresponding selected unit synapse $1601i,j$ storing weight $W^{i,j}$ on a bit line BLi $1603i$, for example Input<0> applied to the bottom-most unit synapse on BL0. At step 1903, the corresponding sense amplifier SAi $1611i$ determines whether the NAND string is conducting (1) or not (0), corresponding to an XNOR-ing of the input and weight values. Step 1905 performs the accumulation, with the sensing result added to a $CNT^{bnn\_out}$ value maintained by the counter CSCi $1613i$. At step 1907, it is determined if there are more input/weight pairs to contribute to the dot-product, corresponding to another input/weight pair for the NAND (or for other NAND strings on other blocks connected along the bit line) and, if so, loops back to step 1901. If all the input/weight pairs have been computed and summed for the $CNT^{bnn\_out}$ of the dot product, the flow move on to step 1909 to convert the popcount $CNT^{bnn\_out}$ value to the dot-product $P^{bnn\_dec}$ by use of Eq. 1. (Step 1908 distinguishes between the binary input and ternary input cases, as discussed below.) In the example of the tables of FIGS. 17 and 18, the S value for Eq. 1 would be 8, while for an entire NAND string as illustrated in FIG. 16 S=32. Note that the NAND array structure of FIG. 16 allows for the computation of a dot-product according to the flow of FIG. 19 to be performed concurrently along each bit line.

FIGS. 20 and 21 consider an example extending the computation of a dot-product for a ternary input-binary weight neural network and how to implement this using a counter based summation digital circuit for an SLC NAND TBN embodiment. FIG. 20 corresponds to FIG. 17 of BNN case, but where the inputs values can now include the values of 0, as well as −1 and +1. This is illustrated by the example of a ternary input vector $I^{tbn}$ that includes −1, 0, and +1 values. The weights are again a binary input vector $W^{tbn}$ with values of −1 and +1. The third line of output values are as before for the −1 and +1 values, being +1 if the weight and input match and −1 if they differ, but with an output of 0 for an input of 0 for either weight value. The dot-product $P^{tbn\_dec}$ then corresponds to summing up the output values, giving a result of 1 in this example.

FIG. 21 maps these TBN inputs and weights onto values 0 and 1. As in FIG. 18, for both weights and inputs the +1 value is mapped to 1 and the −1 value is mapped to 0. Now, however, the 0 input value is now also mapped to 0. This is illustrated in the $I^{bin}$ and $W^{bin}$ lines in the table of FIG. 21. When the $I^{bin}$ and $W^{bin}$ are XNOR-ed, as seen by the current at the sense amplifier, this can lead to invalid outputs for the 0 $I^{bin}$ values, such as seen in the sixth column that has a sense amplifier output of 1 in the table of FIG. 21, whereas the corresponding output value in the table of FIG. 20 is 0. This leads to a popcount value $CNT^{tbn\_dec}=4$. Consequently, a method is needed to adjust the output of the counter-based summation digital circuits CSCi $1613i$ of FIG. 16 to account for these anomalous results for 0 ternary input values.

If the same method is applied as used for the binary case using Eq. 1, this will also lead to an incorrect output result: for example, in the case of FIGS. 20 and 21, Eq. 1 gives $P^{bnn\_dec}=4*2-8=0$, whereas the correct result is 1. However, by discarding the XNOR outputs from the sense amplifiers corresponding to 0 inputs, it is possible to obtain an adjusted, correctly derived $P^{tbn\_dec}$ using Eq. 2:

$$P^{tbn\_dec}=2\mathrm{S}CNT^{tbn\_out}-S^{tbn}, \quad (Eq.\ 2)$$

where $S^{tbn}=S-Z$, S is again the size of the vector and Z is the number of zero inputs. Applying this to the example of FIGS. 20 and 21, this leads to the XNOR (sense amplifier output) output for the (ternary) 0 inputs of columns 2, 3, and 6 being discarded, such that Z=3 and $S^{tbn}=S-Z=5$. The new $CNT^{tbn\_out}=3$, as the XNOR value of column 6 is now discarded as it is from a (ternary) 0 input. Using the adjusted derived $P^{tbn\_dec}$ for TBN can be obtained from Eq. 2 as:

$$P^{tbn\_dec}=2*3-5=1.$$

Referring back to FIG. 19, step 1908 determines whether the memory array is being operated in a binary input (BNN) or ternary input (TBN) mode. (The mode can be established based on the ZID_Enb control signal, as described further below with respect to FIG. 22.) If in the binary mode, the flow continues on to step 1909 as described above and uses Eq. 1. If in the ternary input mode, the flow instead goes to step 1911 and uses Eq. 2 to convert the popcount $CNT^{tbn\_out}$ to $P^{tbn\_dec}$.

Figure 22:
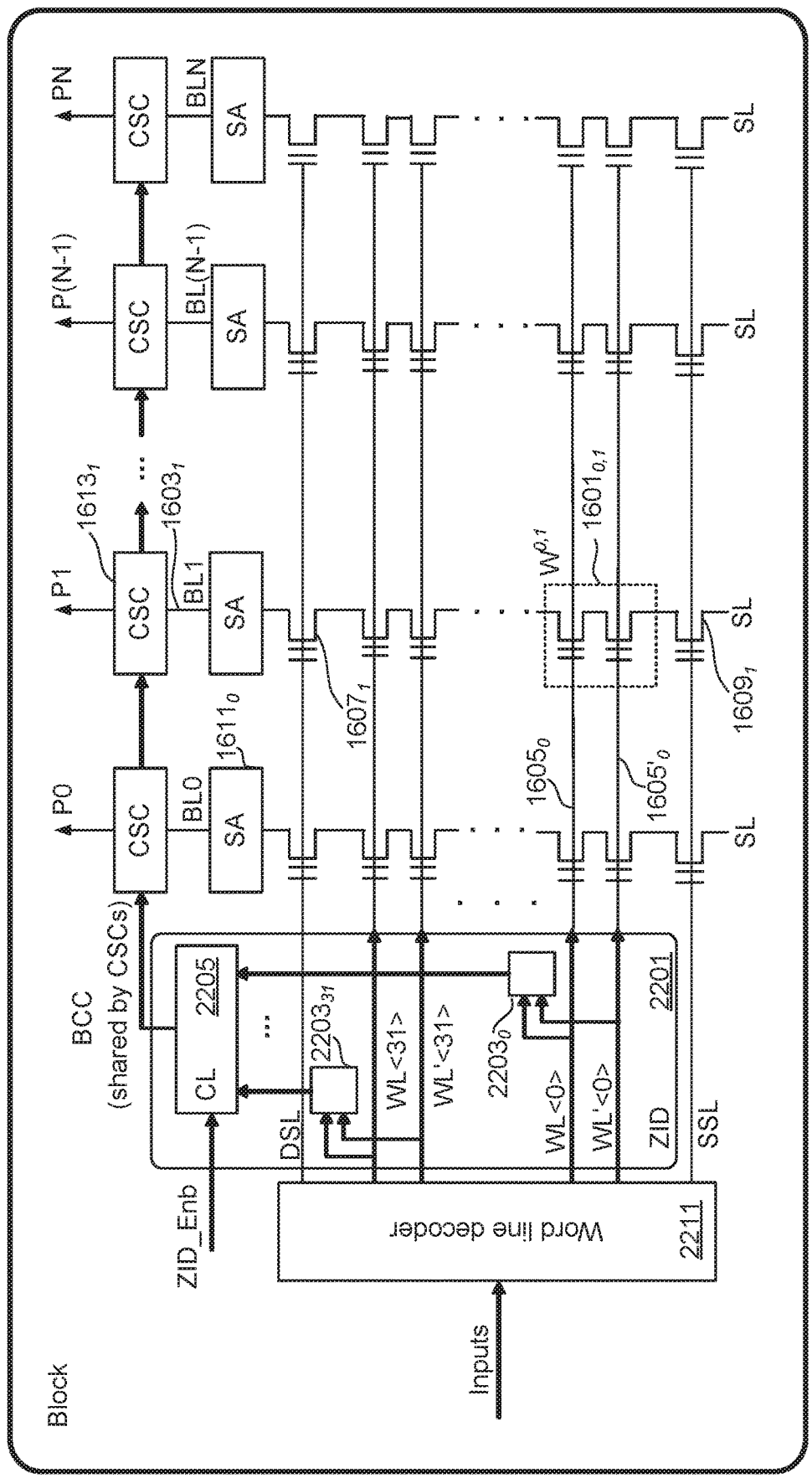
FIG. 22 illustrates an embodiment of a summation circuit for an SLC NAND array to support ternary-binary neural networks.

FIG. 22 illustrates an embodiment of summation circuit for an SLC NAND array to support ternary-binary neural networks. As presented in the high level architecture of FIG. 22, circuitry is introduced to provide early detection of 0 inputs, then discard the impacts of the 0 inputs shown at the outputs of sense amplifiers. More specifically, FIG. 23 repeats many of the elements of FIG. 16 in a somewhat simplified form, but also includes a Zero Input Detection (ZID) unit 2201 and shows a word line decoder block 2211.

The ZID unit 2201 is connected to the word line pairs WL<j>, WL'<j> to detect 0 input data, which is encoded as the two word lines set to Vread. As illustrated in the table of FIG. 15, for both the −1 and +1 ternary inputs the voltage levels for WL<j> and WL'<j> of a selected unit synapse will differ, but be the same for a 0 input. For non-selected unit synapses on the NAND string, both of WL<j> and WL'<j> will be set to the same voltage level of Vpass. Consequently, for a 0 input to the selected unit synapse, the voltage levels on each pair of word lines will match; but for a −1 or +1 input on the selected unit synapse one of the word line pairs (those of the selected unit synapse) will not match, while the voltage levels of other word line pairs (those of all the selected unit synapses) will match. To determine whether the voltage levels of the word line pair WL<j>, WL'<j> match for the applied input voltage pattern, a NOR logic block 2203j is connected to each of the word line pairs. The output of the NOR logic blocks 2203j are connected to a combinational logic circuit CL 2205 to determine whether all of the word line pairs match (a 0 input to the selected unit synapse) or if one of the word line pairs do not match (a −1 or +1 input to the selected unit synapse).

Based on these inputs, the combinational logic circuitry CL 2205 generates a block control signal (BSC) that is provided to the counter-based summation digital circuits CSCi 1613i of each of the bit lines. Each CSC unit CSCi 1613i can increase the count or, if 0 input is detected, override the output of the sense amplifier in the accumulation process and discard the invalid output of sense amplifiers SAi 1611i under the control of BCC signal. The ZID circuit 2201 does not increase the latency of a NAND read command and the ZID logic is not in the critical path of NAND commands A binary neural network can be executed in the ternary-binary architecture of FIG. 22 can by disabling the ZID circuit 2201 by use of a ZID_Enb control signal that could be based on, for example, a mode register value.

Figure 23B:
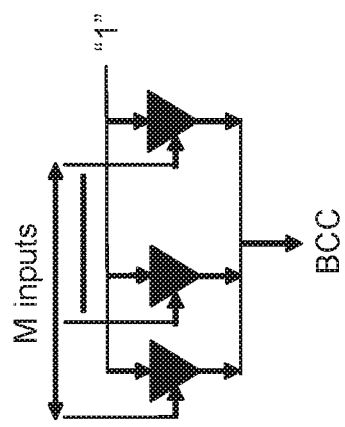
FIGS. 23A and 23B provide two embodiments for the combinational logic circuitry of FIG. 22.
Figure 23A:
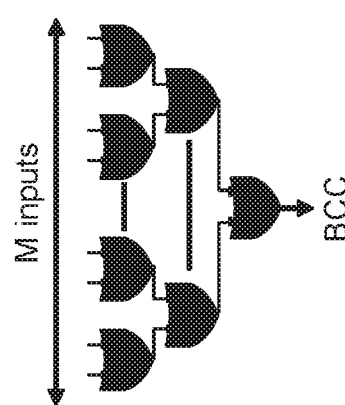

FIGS. 23A and 23B provide two embodiments for the combinational logic circuitry CL 2205. In both cases, for M word line pairs the M inputs will be the outputs of the M NOR logic blocks 2203i and the output the BCC signal. The embodiment of FIG. 23A uses an OR-logic reduction tree to reduce the M outputs from the NOR logic blocks 2203i. The embodiment of FIG. 23B uses a tri-state based circuit, where each tri-state element has a "1" at the A input and the output of the corresponding NOR logic blocks 2203i at the B input.

Figure 24:
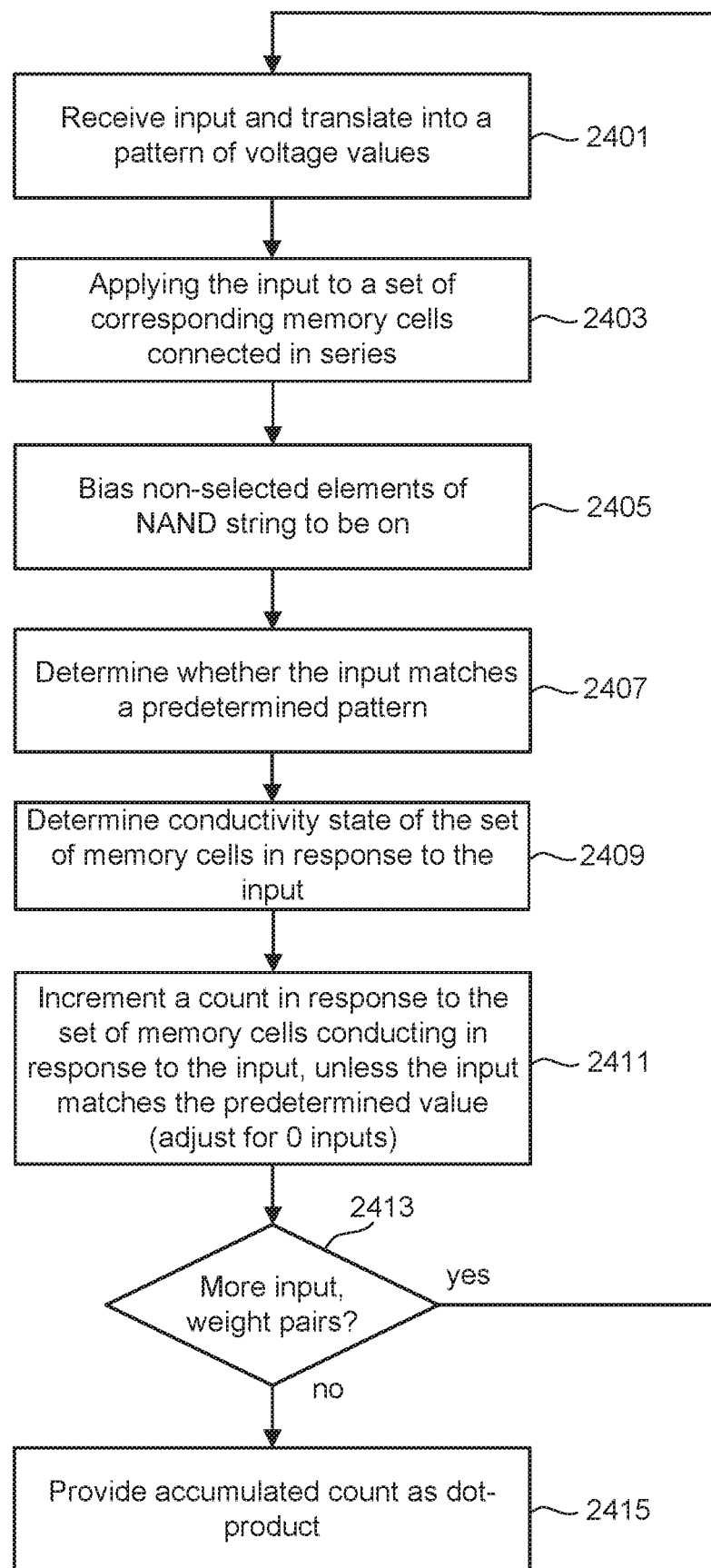
FIG. 24 is a flowchart for one embodiment of a dot-product calculation using a ternary-binary neural network in inference, as illustrated in the tables of FIGS. 20 and 21 and array architecture 22.

FIG. 24 is a flowchart for one embodiment of a dot-product calculation using a ternary-binary neural network in inference, as illustrated in the tables of FIGS. 20 and 21 and array architecture of FIG. 22. Beginning at step 2401, and referring FIG. 22, the memory array receives an input Input<j> of and translates this into a set of voltage values, where in a ternary input the voltage pattern of the input can correspond to a −1, 0, or +1 input value; and at step 2403 applies the voltage level to a word line pair WL<j>, WL'<j> 1605j, 1605'j. As the word lines span the NAND string of the selected block, the process of FIG. 24 can be performed concurrently for any of the NAND strings for the unit synapses connected along the word line pair WL<j>, WL'<j> 1605j, 1605'j. Additionally, in the NAND structure, the other elements of a selected NAND string (SSLi 1609i, DSLi 1607i, and the non-selected memory cells of the NAND string) will be biased to be on, such as applying Vpass, at step 2405. Although listed as an ordered set of separate steps in FIG. 24, steps 2403 and 2405 are typically performed concurrently by the word line decoder 2211.

At step 2407, the NOR logic block 2203j determines whether the voltage pattern of Input<j> matches a 0 input, corresponding to the voltage level on both word lines of the pair WL<j>, WL'<j> 1605j, 1605'j matching at the Vread voltage in the embodiment of this example. The output of the NOR logic blocks is received at the combinational logic circuit CL 2205 and, if the ZID_Enb signal is asserted, the BCC signal is generated and supplied to the CSC circuits 1613i. If the circuit is being used in the binary input BNN mode, ZID_Enb signal is not asserted and the CSC circuits 1613i can operate as illustrated in the table of FIG. 13.

Step 2409 determines the conductivity of set of memory cells of the selected unit synapse. As illustrated in the table of FIG. 15, the conductivity of the NAND string corresponds to the output logic value of the unit synapse in response to the input and can be determined by the sense amplifier SAi 1611i. Based on the conductivity state of the unit synapse and the value of the block counter control (BCC) signal, at step 2411 the value of count of the corresponding CSCi 1613i is either incremented or not as discussed above with respect Eq. 2 and the table of FIG. 21 so that the incorrectly derived contributions to $P^{tbn\_dec}$ are omitted, the result of the sense amplifier overridden, and the 0 input contributions ignored in the count.

Step 2413 determines if there are more input, weight pairs to add to the dot-product and, if so, the flow loops back to step 2401. Once the contributions of all of the input, weight pairs to the dot products have been determined, the dot product can be provided at step 2415. The set of dot-products determined at step 2415 can then serve as the input to a subsequent neural network layer or be the output of inference process.

Figure 26:
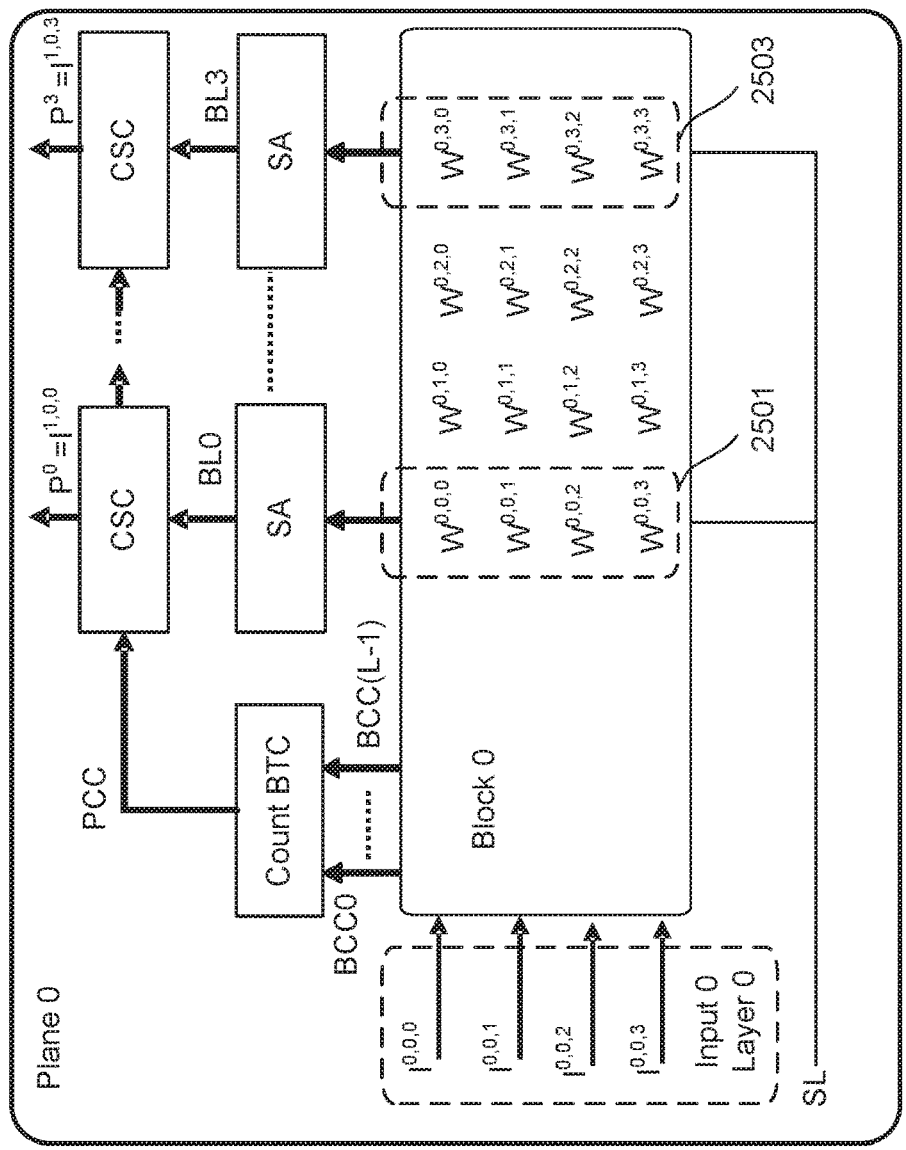
FIGS. 25 and 26 illustrate an example of a neural network and its implementation through a NAND array.
Figure 25:
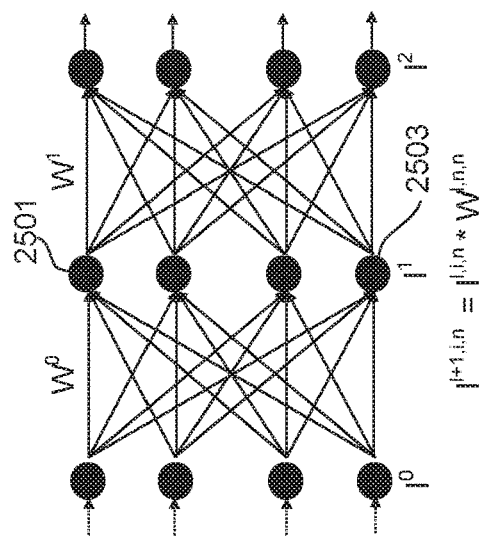

FIGS. 25 and 26 illustrate an example of a neural network and its implementation through a NAND array. In the process described above with respect to FIG. 24, the response to an input of one unit synapse along each bit line is determined based on whether the corresponding sense amplifier determines the unit synapse to conduct or not. For a given block, the contribution of each of the synapses along a NAND string is determined sequentially by the sense amplifiers.

FIG. 25 illustrates an example of three fully connected layers of four nodes each, so that the weight matrix between the layer is a 4×4 matrix. In FIG. 25, the inputs at the nodes are labelled as $I^{l,i,n}$, where l is the layer index, i is the input index, and n is the neuron index. In the example of FIG. 25, three layers are shown, l=(0,1,2), and each has four nodes, n=(0,1,2,3). (The input index is used in some of the following examples of increased parallelism.) The weight matrices $W^{l,n,n}$ connecting the layers are then 4×4 where the matrix multiplication to form the dot-products from the inputs of one layer to the next is:

$$I^{l+1,i,n} = I^{l,i,n} * W_{l,n,n}.$$

The inputs of one layer are applied as voltage patterns on the word line pairs to the unit synapses to generate dot product values that are the inputs of the next layer.

FIG. 26 is schematic representation of how these weight matrices are stored in the unit synapses of a NAND array for the in-array computations of matrix multiplication. Relative to FIG. 22, the block (here labelled Block 0) is represented in terms of the weights stored in the unit synapses, rather than the corresponding memory cell pairs, the voltage level input patterns are represented as a single input, rather than the voltage levels applied to the corresponding word line pairs. The weight matrix between a pair of layers is then stored in a number of unit synapses along a number of NAND strings, where the number of unit synapses per NAND string and the number of NAND strings corresponds to the size of the weight matrix. In this example of 4×4 weight matrices, this corresponds to 4 unit synapses along 4 NAND strings. As represented in FIG. 26 these are 4 adjacent unit synapses on 4 adjacent bit lines, but these can be distribution across the block differently depending on the embodiment.

Relative to the representation of FIG. 25, a weight matrix is stored on the NAND array in a transposed form. For example, the weights from the different inputs of first layer of FIG. 25 into the top node 2501 of the second layer are stored along the first NAND string connected to BL0; and the weights into the bottom node 2503 are stored along the fourth NAND string connected to BL3. To illustrate the correspondence, the reference numbers 2501 and 2503 are also used in FIG. 26 to illustrate the placement of the corresponding weights into these nodes.

To compute the different dot-products of the matrix multiplication, the data inputs are provided in a sequence of read commands. To compute the output of single layer, the pages of weights are then read sequentially by the sense amplifiers over, in this example, four cycles:

cycle 1: achieve $I^{0,0,0} * W^{0,0,0}$
cycle 2: achieve $I^{0,0,1} * W^{0,0,1}$
cycle 3: achieve $I^{0,0,2} * W^{0,0,2}$
cycle 4: achieve $I^{0,0,3} * W^{0,0,3}$, where each of the cycles corresponds to a loop in the flow of FIG. 24 and different sensing orders can be used in different embodiments. The results of the cycles are sensed by the sense amplifier SA on each of the bit lines and accumulated in the CSCs, that will subtract the value presented in PCC signal in order to discard the impact of zero inputs, where the latency of the accumulation process is hidden under the concurrent multiply operations for the following cycles read. The output $P^{tbn\_dec}$ from each bit line will then be the inputs $I^{l+1, i, n}$ of the next layer.

The discussion so far has considered binary neural networks, in which both the inputs and weights are binary valued, and ternary binary networks (TBN), in which ternary weight values are used to improve accuracy. The accuracy of a binary neural network can also be improved through use of ternary weight values. Although more generally applicable, the following considers architectures and methods for neural networks that use ternary inputs and ternary weights (or TTN networks) in a NAND SLC memory array. Among other aspects, the following presents an encoding scheme for neural networks that can accommodate ternary weights as well as ternary inputs and methods for correcting the output of an in-array dot product multiplication to accommodate ternary weights to account for 0 weight values. The ternary weights can be encoded onto a 2 memory cell unit synapse of a NAND string and a digital summation circuit, similar to that described above for the TBN case, can use input from registers that provide information of the number of 0 weights to further adjust the accumulated count to account for zero weights and provide the resultant value for the dot product.

Deep neural network (DNN) inferencing using ternary inputs and ternary weights along with an in-memory architecture offers high accuracy while minimizing overhead due to data movement. Heuristically, increasing the bit-width of quantized activations and weights can improve the accuracy of DNN inference, but it can greatly increase both computation and data movement overhead. When applied to sets of test data, neural networks using ternary-inputs and ternary-weights are found to achieve higher accuracy than neural networks using binary activation/weight, providing accuracy that is close to that of neural networks using full-precision floating point (FP32h) operations, and which do not require floating operations. Although TTN inference in an ASIC/FPGA implementation requires common operations for computation (i.e. XNOR and pop-count), it still suffers the overhead due to data movement (e.g. for large weight models). To improve upon this, the following presents an architecture and methods to realize TTN in-memory in order to minimize the overhead due to data movement and accuracy degradation.

Figure 27:
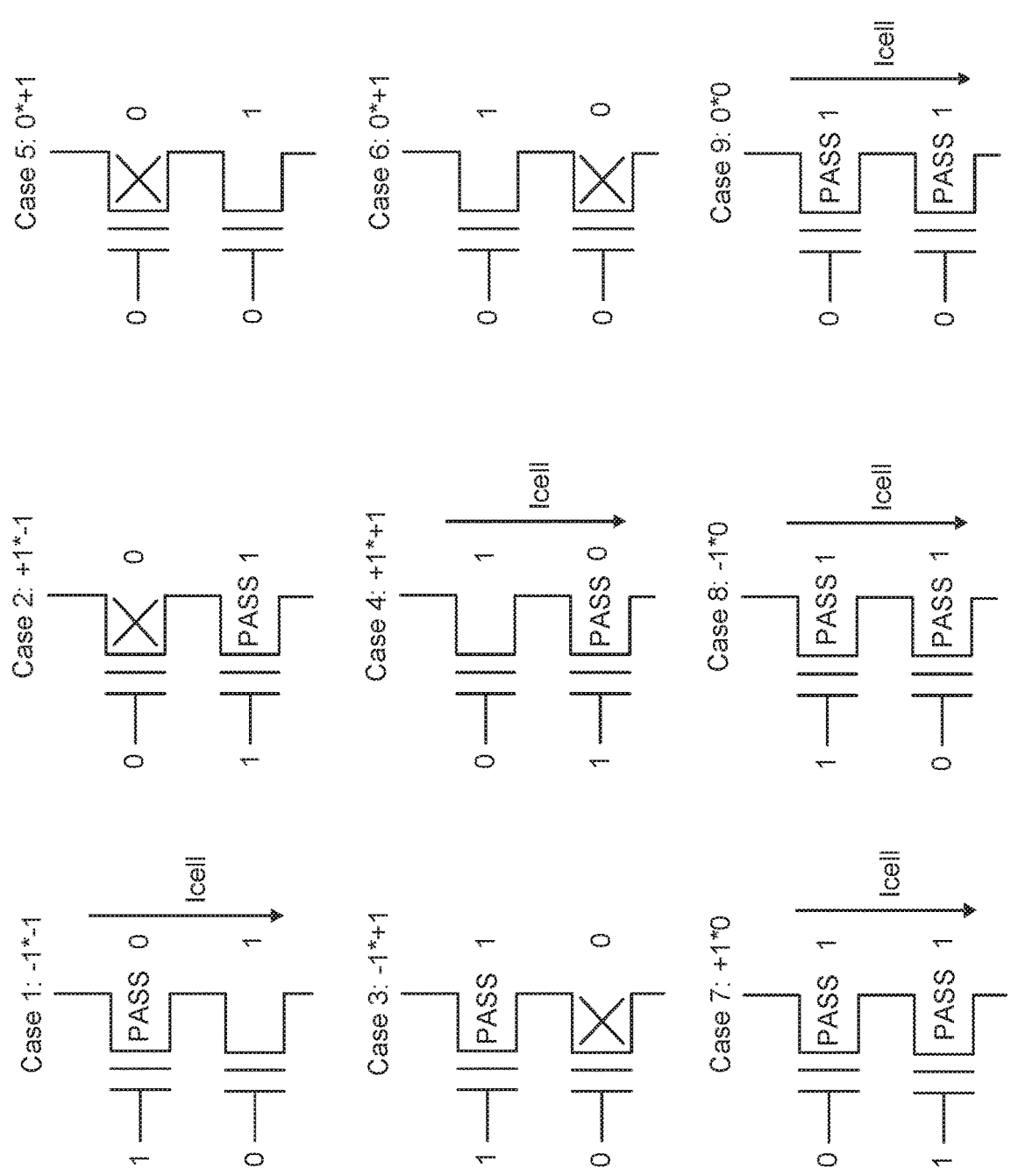

In a TTN network, the truth table and implementation for the TBN networks described above still hold for the weight values of +1 and −1, but are now extended to include a third weight value of "0", for which the output is now input independent and "+1" for all of the ternary input values. FIGS. 27 and 28 respectively correspond to FIGS. 14 and 15 as extended to include a "0" weight value as cases 7-9. Although the weights now have three values, the following discussion is based on a two-cell embodiment for the unit synapse in which the assignment of data state and input voltages for the individual memory cells can be the same as illustrated in FIGS. 10 and 11.

In the table of FIG. 28, the top six lines for cases 1-6 are the same as for FIG. 15, but extended to include a "0" weight value for implementing a ternary weight. Cases 7-9 respectively correspond to input logic values −1, 0 and +1, but now with weight logic value of "0". The −1 and +1 weight values are implemented in the unit synapse as before, but the weight logic "0" is implemented by encoding both of FG1 and FG2 to have a value of "1" (i.e., an erased state with, in this example, a negative threshold value). The ternary input values can be implemented as voltages applied to the control gates of the unit synapse's pair of memory cells as before. This is represented schematically in FIG. 27.

FIG. 27 repeats cases 1-6 from FIG. 14 and adds in cases 7-9. As illustrated for cases 7-9, as both memory cells of the unit synapses are in the low Vth "1" state, they will conduct a current Icell for all combinations Vread, or "0", and Vpass, or "1", being applied to the control gates. This is represented in FIG. 27 where all of cases 7-9 have an output logic of +1, corresponding to a discharged current of Icell and an output voltage drop of either ΔV or 2*ΔV (for the 0 input of case 9 where Vread is applied to both memory cells of the pair). (Note that a zero weight overrules a zero input, in that the 0 input will now conduct as opposed to not conducting for either of the binary weights.) Consequently, the output of a bit line for corresponding extended cases 7-9 is always sensed as logic "1" regardless different input values, thus generating incorrect final results. Because of this, a scheme is introduced to correct the final output due to zero weights.

The impact of zero weights (shown as logic "1" at the output of the sense amplifier) can be eliminated by pre-counting the total number of zero-weight values, storing these in a Zero-Weight Register ($ZW^{TTN}$), and obtaining the final output of TTN dot product ($P^{TTN\_dec}$) by subtracting the value of $ZW^{TTN}$ from the output of ternary binary value ($P^{TBN\_dec}$). The process can be illustrated with respect to FIGS. 29 and 30, which correspond to FIGS. 20 and 21 that were used to describe the ternary-input binary weight dot product adjustment.

FIG. 29 corresponds to FIG. 20 of TBN case, but where the weight values can now include the value of 0, as well as −1 and +1. This is illustrated by the example of a ternary input vector $I^{ttn}$ that includes −1, 0, and +1 values. The input vector of FIG. 29 is the same as the input vector FIG. 20. The weights are now a ternary binary input vector $W^{ttn}$ with values of −1, 0 and +1, where three of the weights are now changed to 0 relative to FIG. 29. The third line of output values are as in FIG. 20 for the −1 and +1 weight values, being +1 if the weight and input match, −1 if they differ, and 0 for an input of 0 for either a −1 or +1 weight value. For a 0 weight, the output is now 0 for any of the ternary inputs. The dot-product $P^{ttn\_dec}$ then corresponds to summing up the output values, giving a result of 1 in this example.

FIG. 30 is the TTN equivalent of the TBN case in FIG. 21 for the in-array computation of the dot product. In FIG. 30, the same input vector $I^{ttn}$ as in FIG. 29 is applied as inputs to word line pairs of the array in which the same weights $W^{ttn}$ as in FIG. 29 are stored in unit synapses, as illustrated by the values in the table of FIG. 28. The output at the sense amplifier for the corresponding bit line, $P^{ttn}$, for the three shown 0 weights is 1 as the NAND string will be conducting for the 0 weight for all input values. The popcount $CNT^{ttn\_out}$ then corresponds the sum of the $P^{ttn}$ values from the sense amplifier. In this example, $CNT^{ttn\_out}=6$, rather than the correct value of $P^{ttn\_dec}=1$. To achieve the correct final output, the memory needs to account for both 0 weights and 0 inputs.

The corrected final output $P^{ttn\_dec}$ for the in-array TTN computation can be obtained by, relative to the $P^{tbn\_dec}$ for the TBN case, subtracting of the total number of weights ($Z^{ttn}$) from the $P^{tbn\_dec}$ of Eq. 2 given above. More specifically, the corrected output $P^{ttn\_dec}$ can be expressed as:

$$P^{ttn\_dec}=2*(CNT^{ttn\_dec}-ZW)-S^{ttn},\qquad(Eq.\ 3)$$

where $CNT^{ttn\_out}$ is the popcount obtained by summing the sense amplifier outputs, $ZW^{ttn}$ is total number of weights contributing to the popcount, and $S^{ttn}$ is calculated the same as $S^{tbn}$ namely the number of zero inputs contributing to the popcount.

Applying Eq. 3 to the example of FIG. 30, $CNT^{ttn\_out}=6$, $ZW^{ttn}=3$, and $S^{ttn}=5$. Putting these values into Eq. 3 give:

$$P^{ttn\_dec}=2*(6-3)-5=1,$$

which is the correct value for the dot product as illustrated by the table of FIG. 29.

Figure 31:
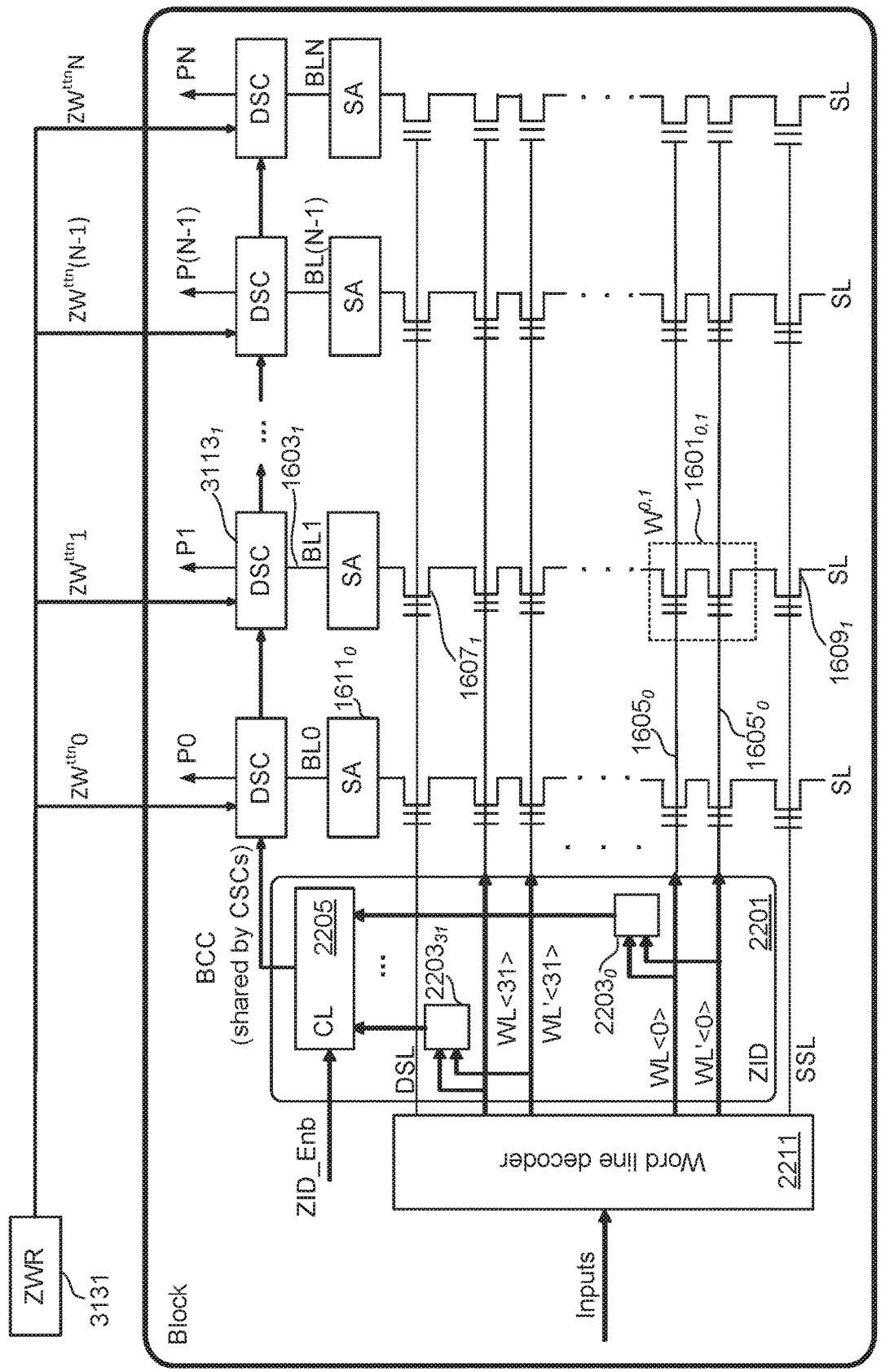
FIG. 31 illustrates an embodiment of a summation circuit for an SLC NAND array to support ternary-ternary neural networks.
Figure 32:
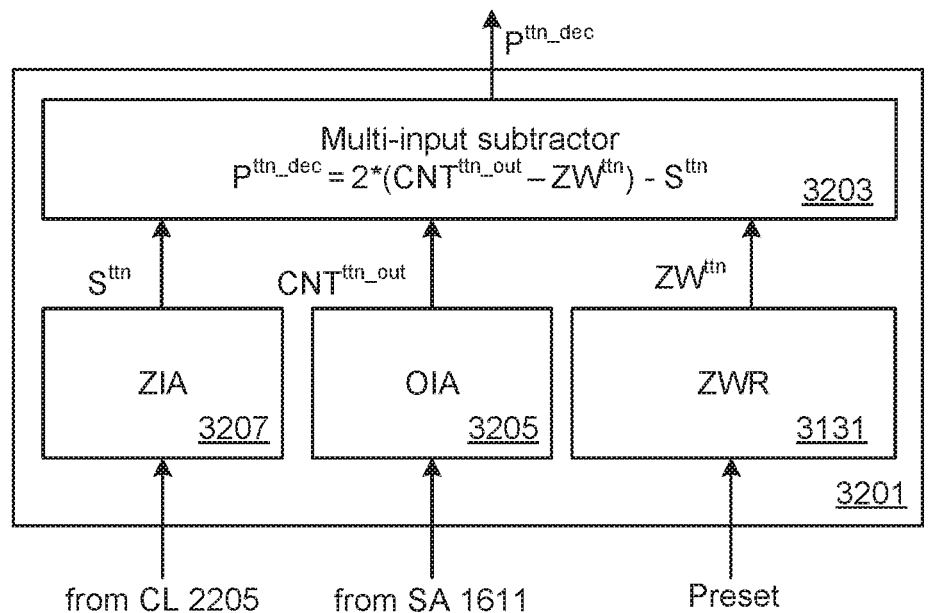
FIGS. 32 and 33 illustrate an embodiment for a digital summation circuit that adjusts for zero weights and zero inputs.
Figure 33:
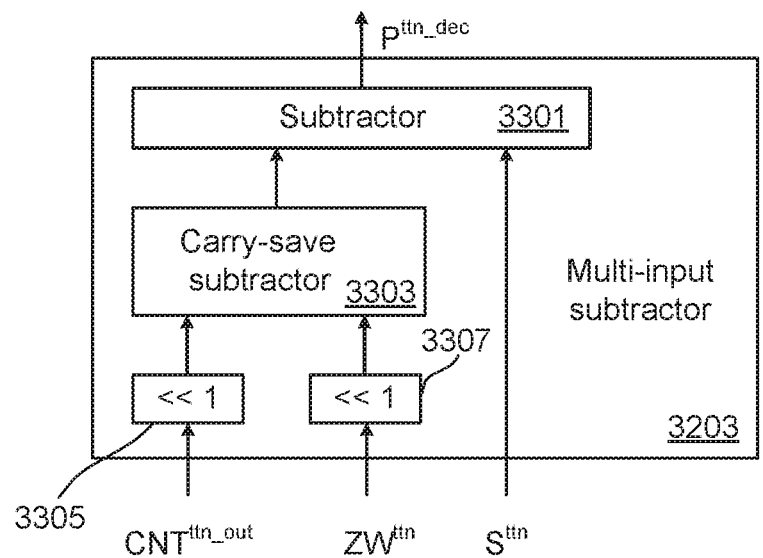

FIG. 31 illustrates an embodiment of a summation circuit for an SLC NAND array to support ternary-ternary neural networks and FIGS. 32 and 33 illustrate an embodiment for a digital summation circuit. Relative to the TBN embodiment of FIG. 22, the digital summation circuit (DSC) associated with each bit line is modified to handle 0 weights and provide the correct output.

Referring to FIG. 31, all of the elements of FIG. 22 are again present and can operate as described above and are numbered the same. The digital summation circuits, or DSCs, $3113_i$ differ in that they can now also correct the count $P^i$ to adjust for 0 weights by receiving the zero weight value $ZW^{ttn}$ for the corresponding bit line. In FIG. 31, each DSC $3113_i$ receives the output of the corresponding sense amplifier $1611_i$, the BCC value, and also the zero weight value $ZW^{ttn}$ from a zero weight register ZWR 3131. The zero weight register ZWR 3131 is configured to contain the total number of zero weight values for each bit line, where the value can range from zero to the total number of synapses along the bit line. The ZWR can be a special set of registers for this purpose that is part of the peripheral circuitry of a die or can use part of a more general register on the die. In some embodiments, it can be implemented as settable fuse values, but will more typically be resettable registers so that the device can be reconfigured. Before the array is used for inferencing, the values for the ZWR can be preset, for example, by a host CPU, a training engine, or inference engine, as described further below.

FIG. 32 is a schematic representation of DSC 3113 and its inputs. The output of the combinational logic circuit CL 2205 is received at a Zero-Input Added ZIA 3207 that sums up the number of zero inputs to provide the value of $S^{ttn}$. A One-Input Adder OIA 3205 receives the output of the corresponding sense amplifier and sums up the number of logical "1" values sensed by the sense amplifier on the corresponding bit line to provide the value of $CNT^{ttn\_out}$. The values $ZW^{ttn}$ for the zero weight register ZWR 3131 will have been determined and saved in the ZWR 3131 prior to inference, present by a host CPU, training engine, or inference engine. To adjust the value of the popcount and provide $P^{ttn\_dec}$, multi-input subtractor 3203 receives the $S^{ttn}$, $CNT^{ttn\_out}$, and $ZW^{ttn}$ values and from these generates $P^{ttn\_dec}$ according to Eq. 3.

FIG. 33 presents one embodiment for the multi-input subtractor 3203, which can be optimized for low delay. Each of $CNT^{ttn\_out}$ and $ZW^{ttn}$ are received at a respective left shift logic element 3305 and 3307 and shifted left by 1 bit (notated "<<1"), corresponding to multiplication by 2. The resultant values of $2*CNT^{ttn\_out}$ and $2*ZW^{ttn}$ is supplied to a carry-save subtractor 3303 to generate and provide $2*(CNT^{ttn\_out}-ZW^{ttn})$. Subtractor 3301 receives the output of carry-save subtractor 3303 and $S^{ttn}$, from which it generates $P^{ttn\_dec}=2*(CNT^{ttn\_out}-ZW^{ttn})-S^{ttn}$ for the corresponding bit line.

Figure 34:
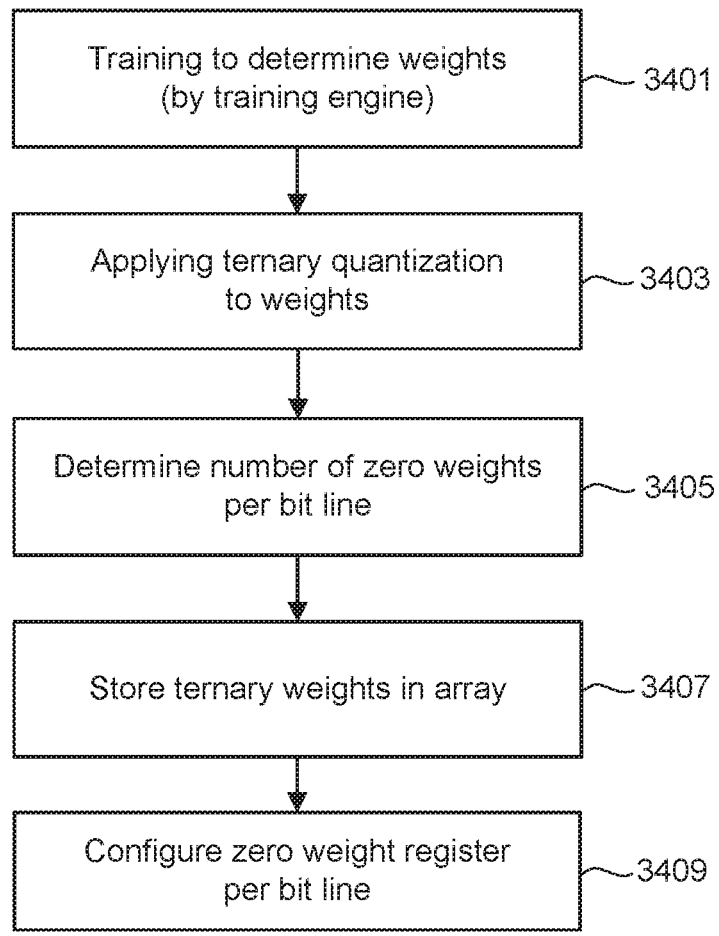
FIGS. 34-36 are flowcharts for embodiments for configuring a zero-weight register for use in an in-array inferencing operation with ternary valued weights.
Figure 35:
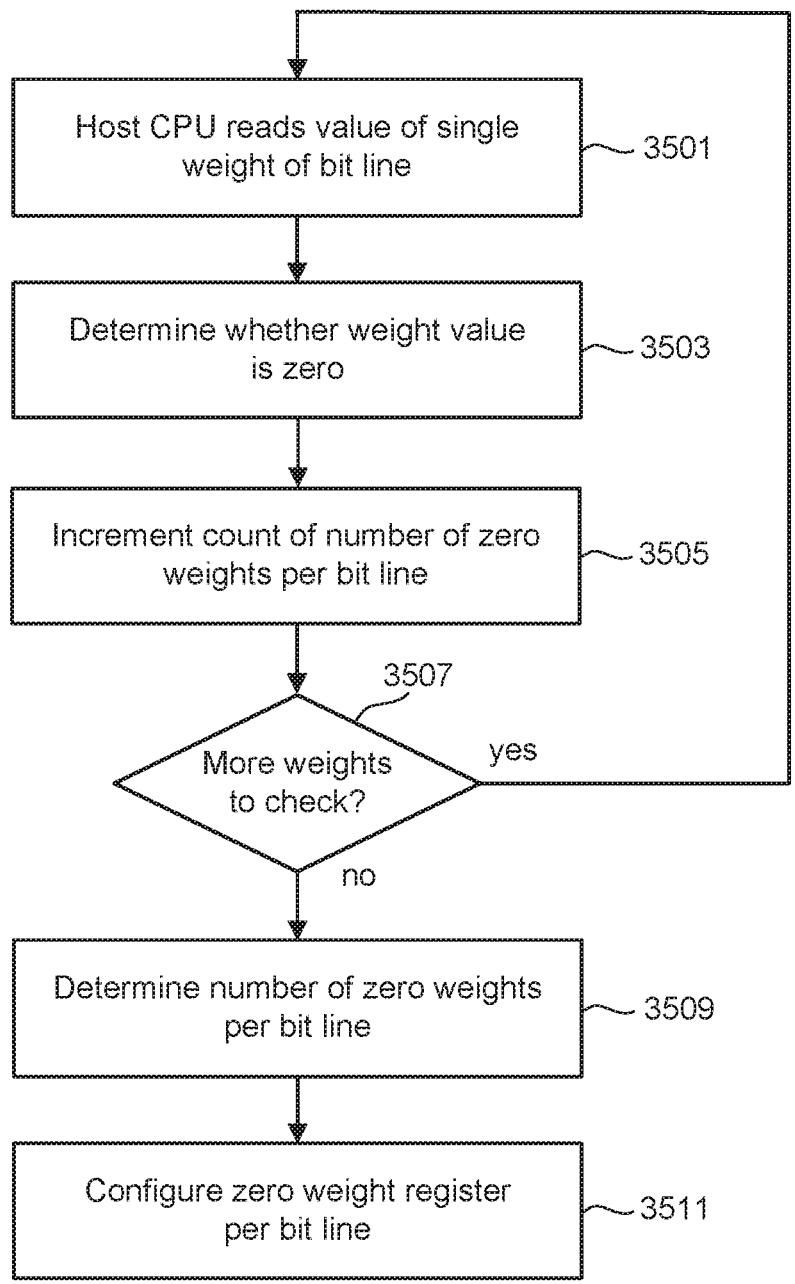
Figure 36:
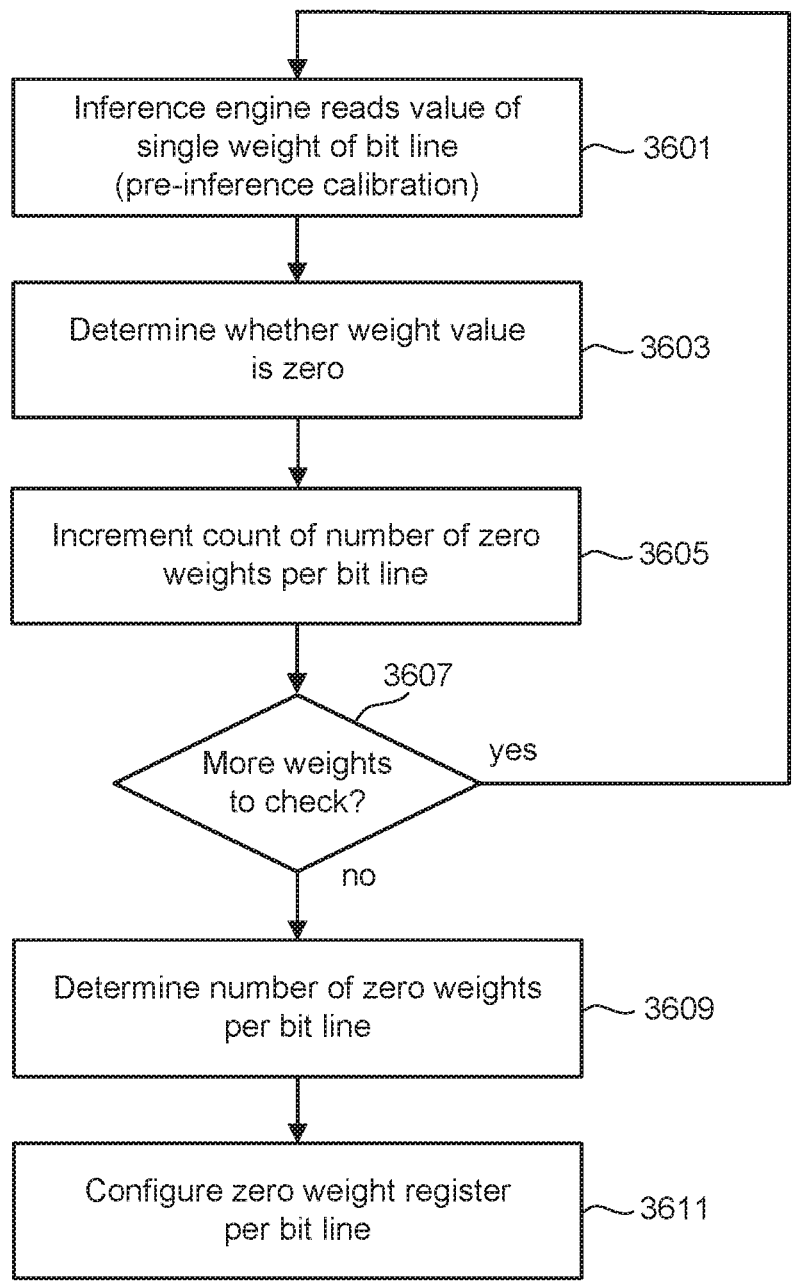

FIGS. 34-36 are flowcharts for embodiments to configure the zero-weight register of a memory die. In the embodiment of FIG. 34, a training engine can externally configure ZWRs during the training phase for the array. In the embodiment of FIG. 35, a host CPU, that may or may not be the same as training engine, can externally configure ZWRs before the inferencing phase. In the embodiment of FIG. 36, the ZWRs are configured internally by the inferencing engine before inferencing input data.

The flow of FIG. 34 begins at step 3401 with the training of a neural network by a training engine. For example, step 3401 can correspond to the flow of FIG. 7A leading up to step 711. Once the weights are determined, at step 3403 the weights are quantized into ternary form. Once the ternary values of the weights are known, along with how these will be stored on an array, the training engine can determine the number of 0 weights per bit line at step 3405. Once the ternary valued weights and the number of 0 weights per bit line are determined at steps 3403 and 3405, the weights can be written into the die at step 3407 and the register values of ZWR 3131 configured at step 3409 to hold the number of 0 weights for each bit line. Although the flow of FIG. 34 is ordered to show the memory array being configured to store the weights at step 3407, in other embodiments the weights can be written into the array before step 3405 or after, or concurrently, with step 3409.

FIG. 35 is a flow for an embodiment in which a host CPU, such as host processor 122 of host 120 in FIG. 1, externally configures ZWR 3131 before the corresponding array is used for inferencing. In this embodiment, the weights can have been previously written into the array and the host CPU can be different than the training engine or, in some cases, may be the same. Beginning at step 3501, the host issues a command to the array to read a single weight along each of the bit lines of the array. Referring back to the embodiment of table of FIG. 28, the for determining that whether a unit synapse holds a 0 weight corresponds to case 9, where the two word lines of the for the unit synapse are both set to Vread (e.g. V1=V2=0 in the embodiment of FIGS. 27 and 28), with the non-selected word line pairs of the NAND string are all biased at the Vpass level. Under these conditions, a NAND string will conduct for a 0 weight value, but not for the −1 or +1 weight values. All of the unit synapses along the selected word line pair can be determined concurrently by the sense amplifier along the corresponding bit line.

Step 3503 determines if the weight value on the selected word line pair is a 0 weight for each of the bit lines. As illustrated for case 9 in the embodiment shown in FIGS. 27 and 28, a zero weight encoded by setting both FG1 and FG2 to "1", so that the current Icell will appear in the bit line. This current is sensed by the corresponding sense amplifier as a logic "1" and a zero weight is counted for the bit line. In contrast, a non-zero weight is encoded by either FG1=0, FG2=1 or FG1=1, FG2=0, so that there is no Icell current existing in the bit line and the output of the corresponding sense amplifier would show logic "0" and this (non-zero) weight is not counted. Based on the result, the host CPU can increment a running count of the number of zero weights for each of the bit lines at step 3505.

Step 3507 determines whether there are more weights to check and, if so, loops back to step 3501 for more read iterations and repeats steps 3501, 3503, and 3505 for the next word line pair and its unit synapses. These can be done in any convenient order, but will typically work sequentially through the array. If there are not more weights to check, the flow moves on the step 3509.

Step 3509 determines the number of zero weights for each of the bit lines. This will correspond to the value for the running counts from step 3505 once all of the weights along each bit has been checked. The ZWR 3131 can then be configured at step 3511 by storing each bit line's $ZW^{ttn}$ so that it can be supplied to the corresponding DSC 3113.

In the flow of FIG. 35, as the ZWR is externally configured by a host's CPU before inferencing. Consequently, to determine the zero weights the host will have access to the weight values stored on the array. In some applications, the provider of the weights may want to keep this data set secure, so that it cannot be accessed by a host or user, but only used for inferencing. FIG. 36 is a flow for the ZWR to be configured internally by the inference engine itself, so that weight data does not need to be externally accessed and can be kept secure.

FIG. 36 is a flow for an embodiment in which an inference engine (that is, the memory system storing weights and which performs the inferencing as an in-array operation) itself configures ZWR 3131 before the array is used for inferencing. In this embodiment, the weights have been previously written into the array. Depending on the embodiment, the processed can be performed on the memory die itself by the on-chip control circuitry (310 of memory die 300 in FIG. 5), at the memory package level, or by the controller 102 of the memory system 100 in FIG. 1. For any of these cases, information on the weights themselves need not be transferred over the bus structure 130 to the host 120. Beginning at step 3601, the inference engine reads a single weight along each of the bit lines of the array. Step 3601 can be performed as described above with respect to step 3501 of FIG. 25, except that the process is controlled by the inferencing engine itself without host involvement, except possible for a command that would initiate the ZWR configuration process. Alternately, the ZWR configuration process could be initiated by the inferencing engine as a first phase in response to a request to perform inferencing. Steps 3603, 3605, 3607, 3609 and 3611 can performed similarly to respective steps 3503, 3505, 3507, 3509 and 3511, but again as an internal process for the inferencing engine.

Figure 37:
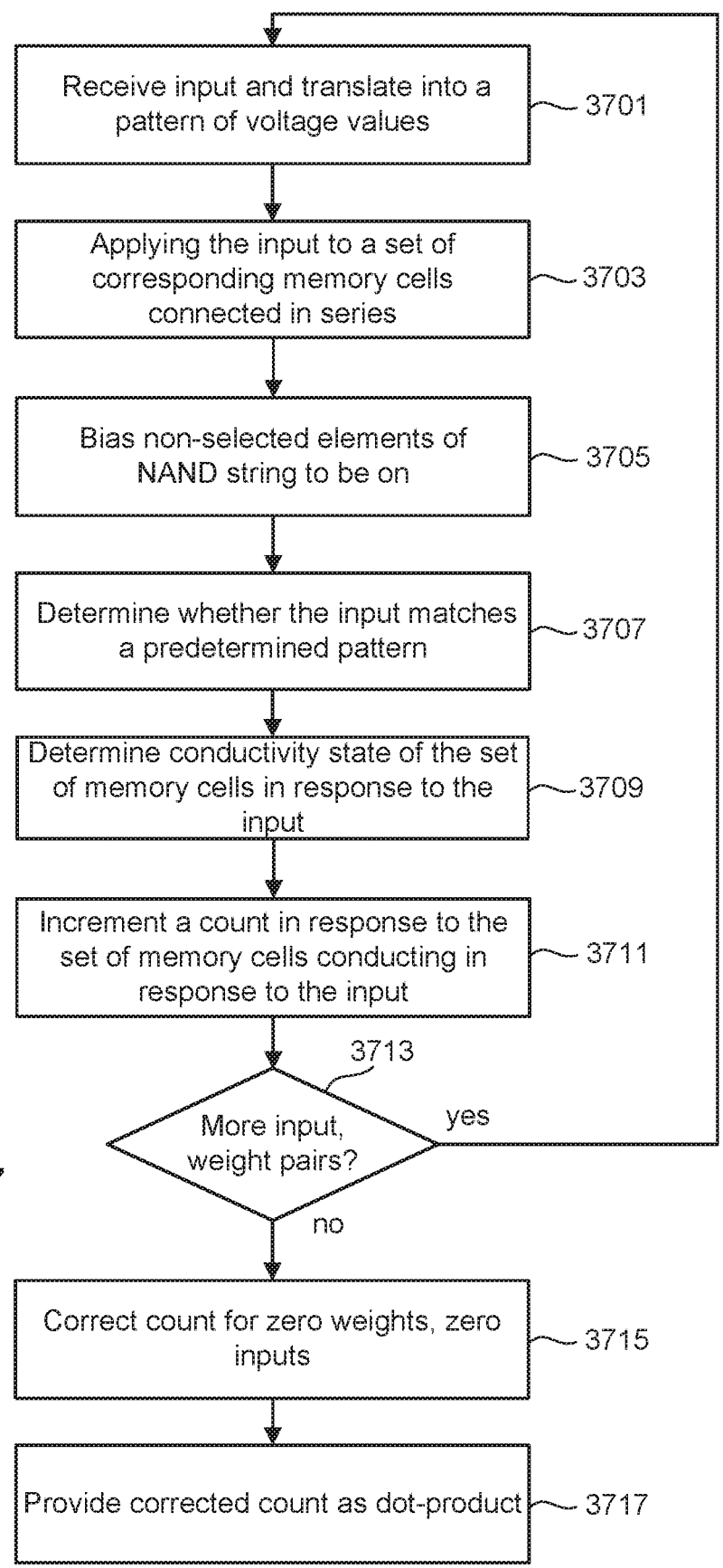
FIG. 37 is a flowchart for one embodiment of a dot-product calculation using a ternary-ternary neural network in inference, as illustrated in the tables of FIGS. 29 and 30 and array architecture of FIG. 31.

FIG. 37 is a flowchart for one embodiment of a dot-product calculation using a ternary-ternary neural network in inference, as illustrated in the tables of FIGS. 29 and 30 and array architecture of FIG. 31. Beginning at step 3501, and referring FIG. 31, the memory array receives an input Input<j> of and translates this into a set of voltage values, where in a ternary input the voltage pattern of the input can correspond to a −1, 0, or +1 input value; and at step 3503 applies the voltage level to a word line pair WL<j>, WL'<j> 1605j, 1605'j. As the word lines span the NAND string of the selected block, the process of FIG. 37 can be performed concurrently for any of the NAND strings for the unit synapses connected along the word line pair WL<j>, WL'<j> 1605j, 1605'j. Additionally, in the NAND structure, the other elements of a selected NAND string (SSLi 1609i, DSLi 1607i, and the non-selected memory cells of the NAND string) will be biased to be on, such as applying Vpass, at step 3705. Although listed as an ordered set of separate steps in FIG. 37, steps 3703 and 3705 are typically performed concurrently by the word line decoder 2211.

At step 3707, the NOR logic block 2203j determines whether the voltage pattern of Input<j> matches a 0 input, corresponding to the voltage level on both word lines of the pair WL<j>, WL'<j> 1605j, 1605'j matching at the Vread voltage in the embodiment of this example. The output of the NOR logic blocks is received at the combinational logic circuit CL 2205 and, if the ZID_Enb signal is asserted, the BCC signal is generated and supplied to the DSC circuits 3113i, where the zero input adder ZIA 3207 accumulates the number of 0 inputs that will contribute to $S^{ttn}$. If the circuit is being used in the binary input mode, ZID_Enb signal is not asserted and CL 2205 will not be active.

Step 3709 determines the conductivity of set of memory cells of the selected unit synapse. As illustrated in the table of FIG. 28, the conductivity of the NAND string corresponds to the output logic value of the unit synapse in response to the input and can be determined by the sense amplifier SAi 1611i. Based on the conductivity state of the unit synapse and the value of the block counter control (BCC) signal, at step 3711 the value of count for the one-input adder 3205 of the corresponding DSCi 3113i is either incremented or not as discussed above with respect Eq. 3 and the table of FIG. 30.

Step 3713 determines if there are more input, weight pairs to add to the dot-product and, if so, the flow loops back to step 3701. Once the contributions of all of the input, weight pairs to the dot products have been determined, the popcount is corrected according to Eq. 3 for 0 inputs and 0 weights at step 3715 as described above with respect to FIGS. 32 and 33. The dot corrected product can then be provided at step 3715. The set of dot-products determined at step 3717 can then serve as the input to a subsequent neural network layer or be the output of inference process.

Figure 38:
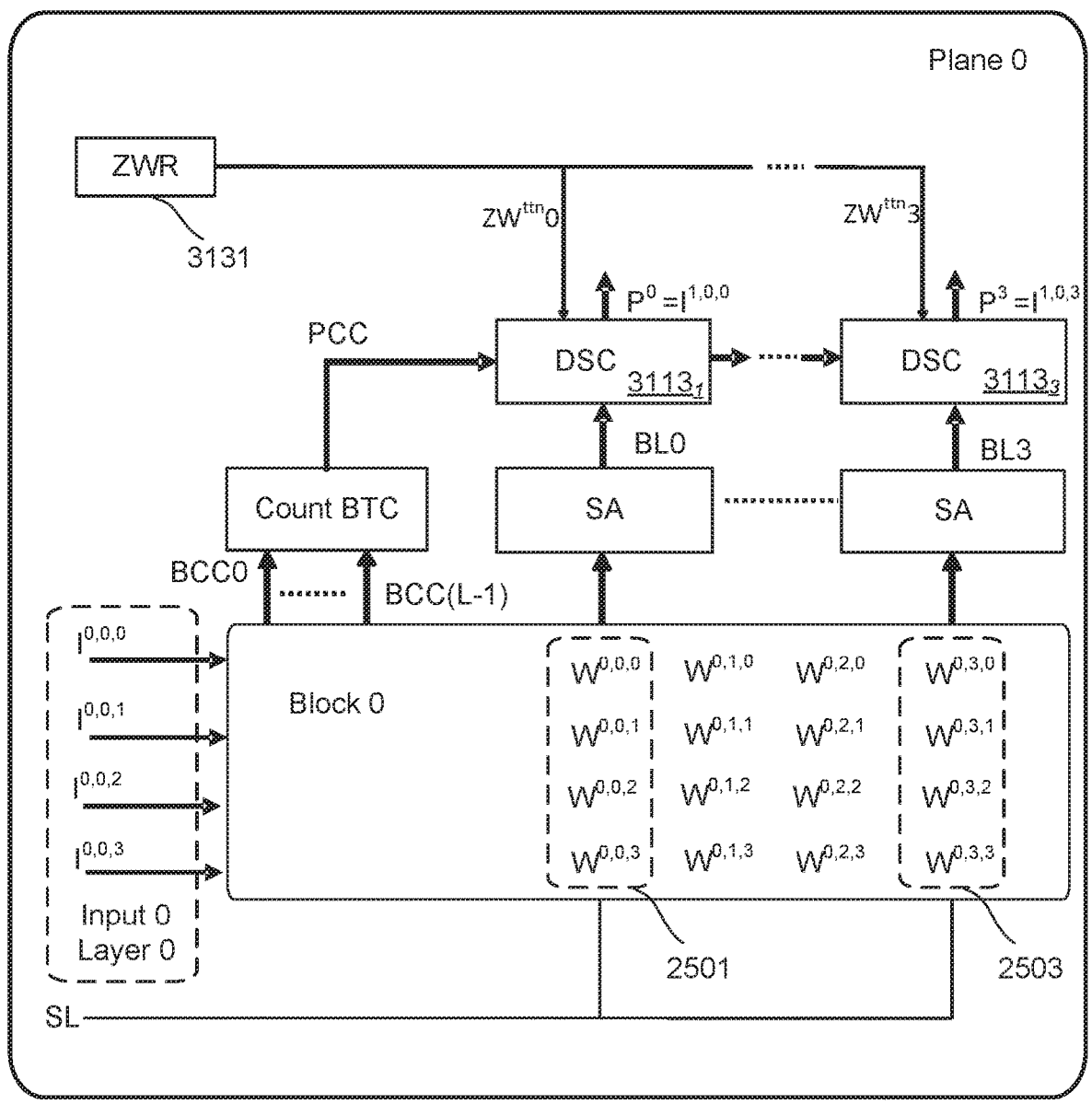
FIG. 38 is schematic representation of how weight matrices are stored in the unit synapses of a NAND array for the in-array computations of matrix multiplication for a ternary-ternary network.

FIG. 38 is schematic representation of how weight matrices are stored in the unit synapses of a NAND array for the in-array computations of matrix multiplication for a ternary-ternary network. FIG. 38 repeats the elements of FIG. 26 of the ternary-binary network, but the CSC circuits of FIG. 26 are now replaced with the digital summation circuits DSC 3113. DSC 3113 can again be implemented as described in the embodiments of FIGS. 31 and 32, except it will now be the multi-bit PCC value supplied to the ZIA 3207.

Figure 39:
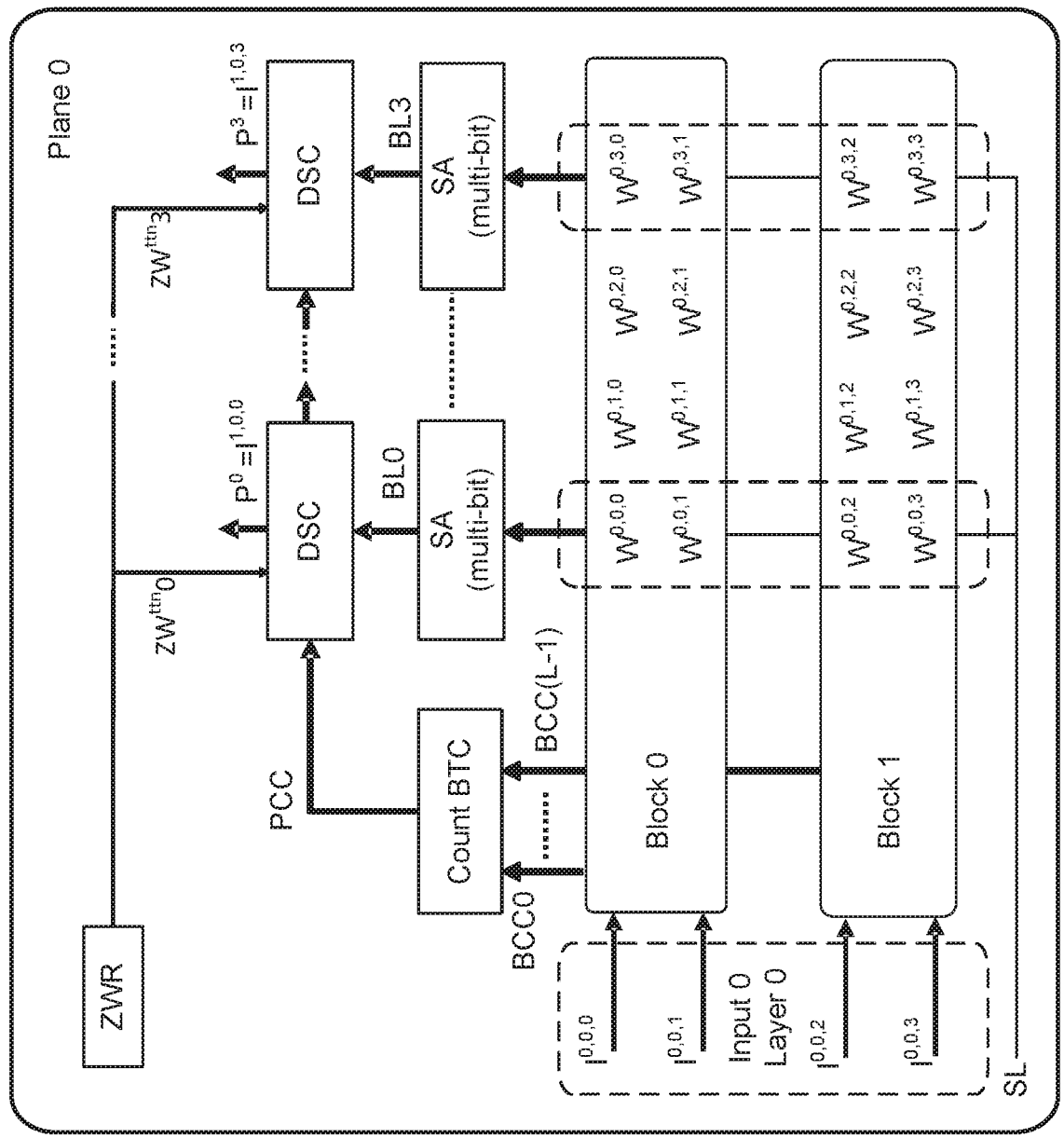
FIG. 39 illustrates an example of a neural network and its implementation through a NAND array to achieve a high parallelism across NAND blocks by leveraging multiple blocks within a single plane.

FIG. 39 illustrates an example of a neural network and its implementation through a NAND array to achieve a high parallelism across NAND blocks by leveraging multiple blocks within a single plane. In the process described above with respect to FIGS. 37 and 38, the response to an input of one unit synapse along each bit line is determined based on whether the corresponding sense amplifier determines the unit synapse to conduct or not. FIG. 39 considers an embodiment using a multi-bit sense amplifier, such as one that can distinguish between different current level, allowing multiple blocks within a single plane to be sensed concurrently. Consequently, the input to the OIA 3205 of the DSCs in the embodiments of FIGS. 31 and 32 will be the multi-bit output of the corresponding sense amplifier.

In a standard read operation where the object is to determine the data state stored in a memory cell, the determination is made by a sense amplifier based on a current or voltage level along on a bit line based on whether or not the selected memory cell conducts. If multiple cells along a common bit line were sensed at the same time, where some conduct and some do not conduct, it would not be possible to determine which of the individual memory were the conducting cells memory cells and establish their corresponding data states. For the DSC's output $P^{tbn\_dec}$ from the matrix multiplication, however, it is only the sum of the number of unit synapses that conduct in response to the inputs that is of concern, not which of the individual synapses contribute. Consequently, the response of multiple unit synapses on different blocks in response to a corresponding set of inputs can be determined concurrently, thereby increasing parallelism, if the sense amplifier is able to determine the number of conducting synapses. By incorporating multi-sense amplifiers, the embodiment of FIG. 39 lets multiple unit synapses along a common bit line from differing block to be sensed in parallel.

FIG. 39 is arranged similarly to FIG. 38 and is again shown storing the same 4×4 weight matrix connecting the first two layers of FIG. 25. FIG. 39 differs from FIG. 38 in that the weights are now distributed between two different blocks, here labelled Block 0 and Block 1, but these could be any two blocks of the same plane and the discussion can be extended to more than two blocks to further increase parallelism. As discussed above with respect to FIGS. 25 and 26, the weight matrix is again stored in a transposed form.

FIG. 39 also differs in that the block counter control BCC from all of the blocks being sensed need to be taken into account to properly offset the DSC counts for 0 input values. The Plane Counter Control (PCC) is a multi-bit signal which indicates the total number of zero inputs existing in the L blocks of a plane. As only one input is applied at a time to a given block, only one zero input per block at most will be fed into the Count BTC block logic at each cycle of a sequence of read commands to determine the number of 1s from the different blocks. The DSCs use the value presented in the PCC signal and the values from the ZWR in order to alter the count and account for 0 inputs existing in the multiple blocks that are accessed in parallel and also for the 0 weights along the corresponding bit line. The multiple blocks sharing a multi-bit sense amplifier and DSC can then be accessed in parallel to compute the output of a single layer of neural network.

To perform a matrix multiplication, data inputs are provided in a sequence of read commands, but to compute the output of single layer, multiple blocks are now read in parallel (one page of unit synapses per block). In the example of FIG. 39 for the matrices of FIG. 25, where two blocks are activated concurrently, an output of a layer can be computed within a 2-cycle latency:

cycle 1: achieve $I^{0,0,0}*W^{0,0,0}+I^{0,0,2}*W^{0,0,2}$
cycle 2: achieve $I^{0,0,1}*W^{0,0,1}+I^{0,0,3}*W^{0,0,3}$ where cycle 2 is accumulated while the output is calculated for cycle 1, so that the accumulation latency is hidden under concurrent multiply operations.

Figure 40:
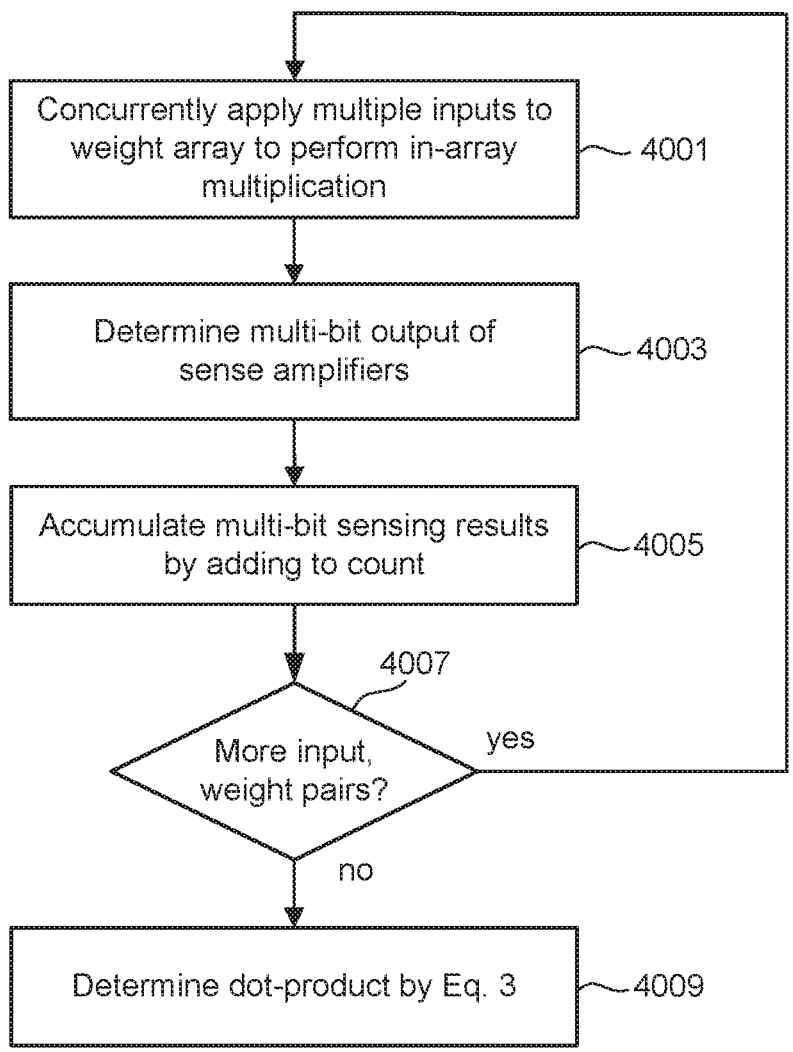
FIG. 40 is a flowchart for one embodiment of a dot-product calculation similarly to FIG. 19, but that incorporates the multi-block parallelism illustrated by FIG. 39.

FIG. 40 is a flowchart for one embodiment of a dot-product calculation similarly to FIG. 19, but that incorporates the multi-block parallelism illustrated by FIG. 39. Relative to step 1901, the parallel sensing of multiple blocks at step 4001 can now concurrently apply multiple inputs concurrently in each loop. At step 4003, the output of the sense amplifier is now a multi-bit value, rather than the binary value of step 1903, and corresponds to the number of conducting unit synapses along a bit line. The multi-bit value is then accumulated at step 4005. Step 4007 determines where there are more input, weight pairs that need to be included in the dot calculation and, if so, the flow loops back to step 4001; if not, the flow moves to step 4009. At step 4009 the dot product is determined according to Eq. 3.

Although the flow of FIG. 40 uses Eq. 3 at step 4009, it can also accommodate binary inputs, binary weights, or both. In the case of binary weights, where ZID in not enabled or the zero-input detection element are absent, $S^{tm}$ in Eq. 3 will be zero. In the case of binary weights, the values of the ZWR will be absent or have zero values, in which case Eq. 3 reduces to Eq. 2. For both binary inputs and binary weights, Eq. 3 reduces to Eq. 1.

To further increase parallelism, the number of blocks sensed concurrently can be increased beyond the two shown in the example of FIG. 39 up to the total number of inputs for a layer. The degree of parallelism can be based on considerations including the amount of the resultant current that would be drawn and the level of resolution that can reasonably be achieved by the multi-bit sense amplifiers from the available current window.

Figure 41:
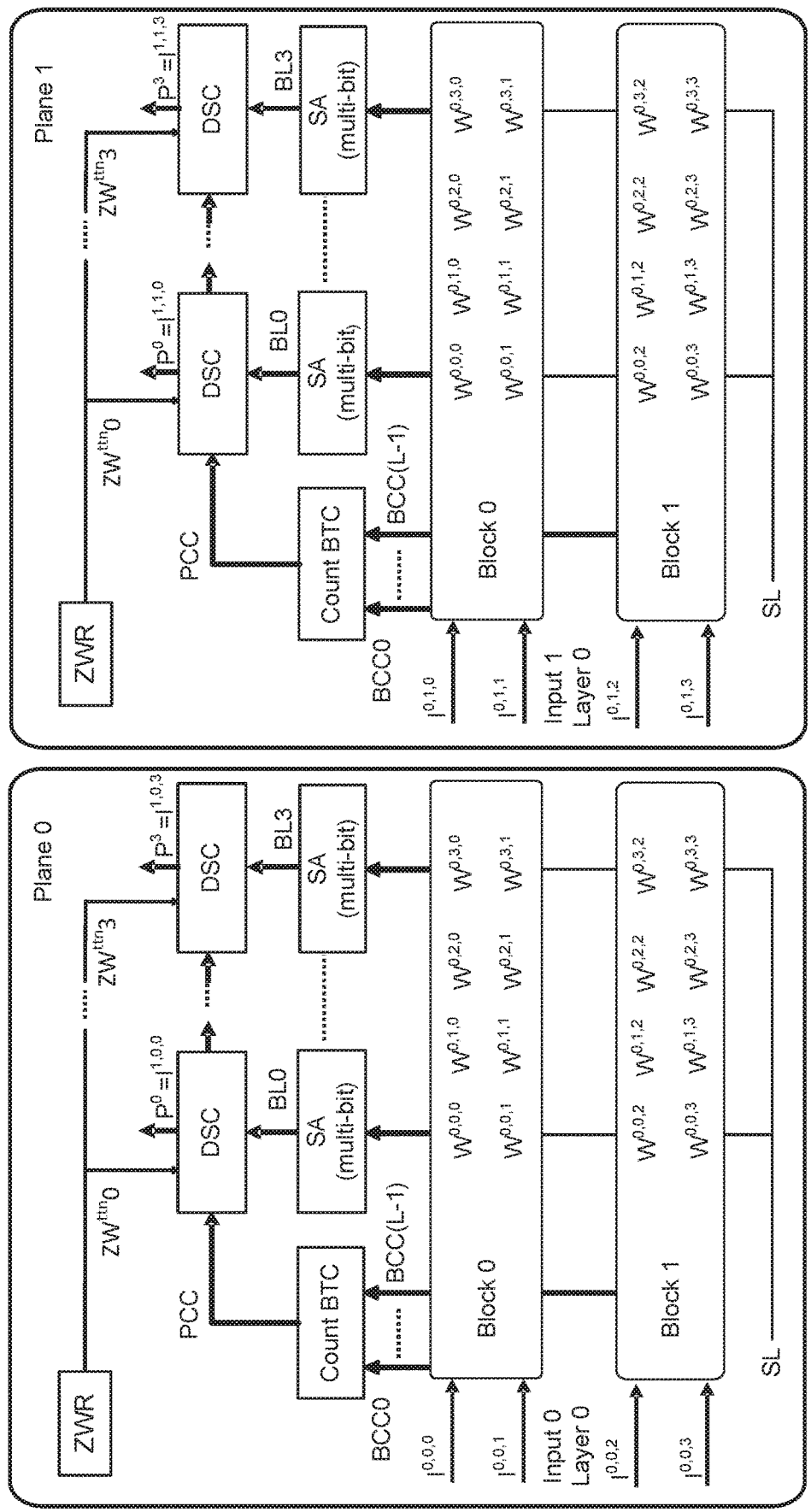
FIG. 41 illustrates additional embodiments that can inference for the inputs of a neural network concurrently across multiple planes.

FIG. 41 illustrates additional embodiments that can further increase parallelism by using an architecture that can inference for the inputs of a neural network concurrently across multiple planes. The multiple plane implementation can be used for sensing a single block at a time within each plane (as in FIG. 38) or for multiple blocks at a time within each plane (as in FIG. 39). The example of FIG. 41 is again based on the example of the network of FIG. 25 and uses two planes and two blocks within each plane, although both the number of planes and blocks can be extended.

FIG. 41 shows two planes, Plane 0 and Plane 1, for an embodiment where two blocks per plane are sensed concurrently, where the planes can be on a common die or on different die. For both of Plane 0 and Plane 1, the weights are stored as in FIG. 39 and the other elements are also repeated from FIG. 39. In the embodiment of FIG. 41, each plane is shown as having its own ZWR, but if both planes are formed on the same memory chip there can be a single ZWR for all of the planes on the memory chip. Where the planes differ is that input index for the two planes differ, with inputs $I^{0,0,n}$ for Plane 0 and the subsequent set of inputs to the layer of for Plane 1.

In block-level parallelism, the memory can use multiple blocks of single plane to compute one output of a single layer, where the read commands can be issued in parallel to access multiple blocks as described with respect to the FIG. 39, with one page (of unit synapses) accessed per block in a cycle. By adding the plane-level parallelism of FIG. 41, multiple planes can be used to compute multiple outputs of a single layer by using the same weight matrix is stored in both planes and where data can be provided to both planes in parallel. In the embodiment of FIG. 41, using 2 planes with 2 blocks/plane in parallel, the two outputs of a single layer can be computed within a 2-cycle latency, where the accumulation latency is hidden under multiplication (read command)

Parallelism can also be increased through use of plane pipelining, where the output of one plane (corresponding to the matrix multiplication between one set of nodes) can be used as the input of another plane (corresponding to the matrix multiplication between the next set of nodes). Plane pipelining can further be combined block level parallelism, plane level parallelism, or both to achieve even greater levels of parallelism.

Figure 42:
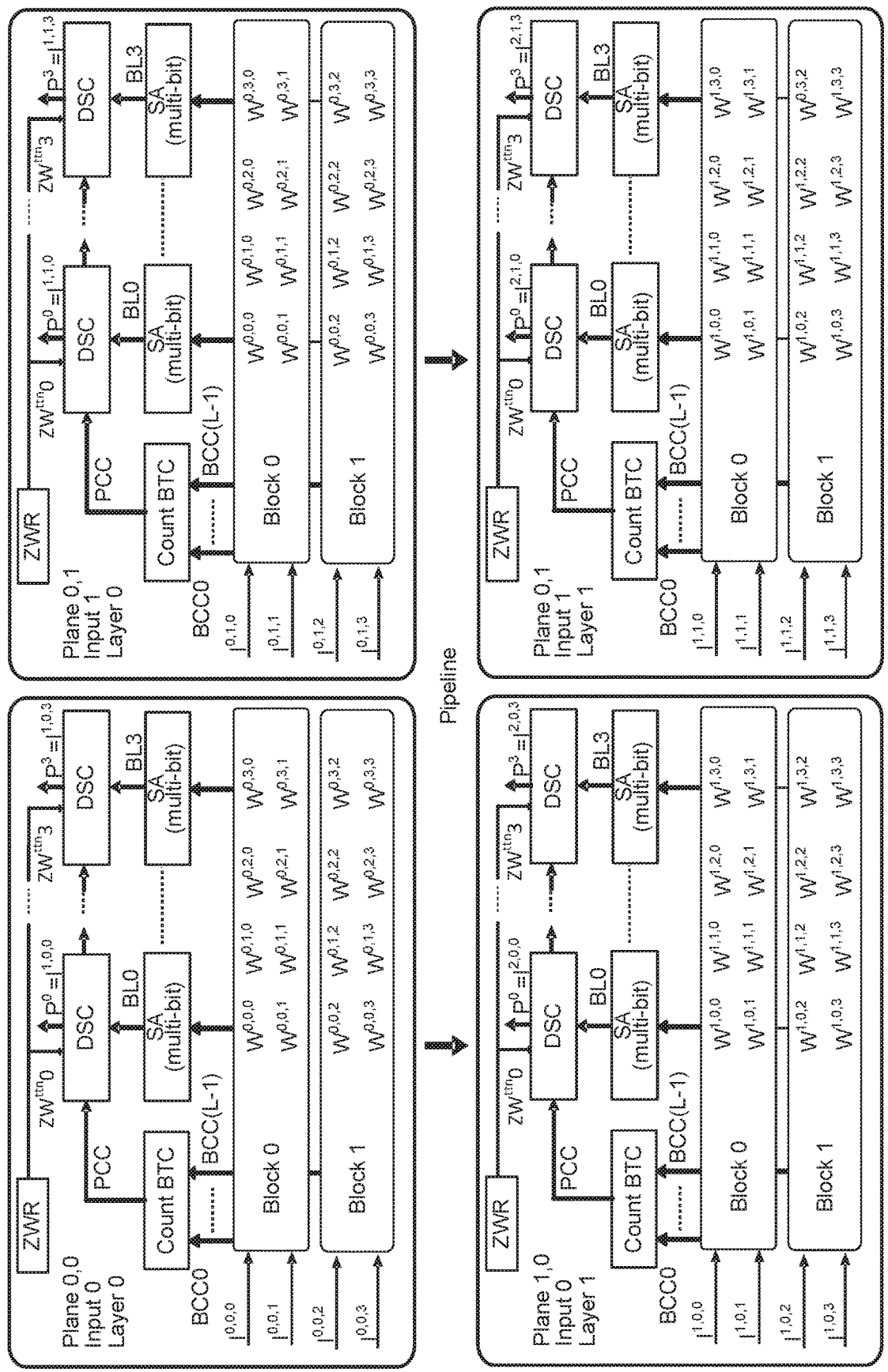
FIG. 42 illustrates an embodiment of plane pipelining for different neural network layers.

FIG. 42 illustrates an embodiment of plane pipelining for different neural network layers. Referring back to the example of FIG. 25, the first stage in the pipeline stores the weight matrix between layers 0 and 1, and next stage stores the weight matrix connected layers 1 and 2. The example of FIG. 42 is for two stages, and also includes 2-plane parallelism and 2-block parallelism, but these are each independent aspects and more pipeline stages can be similarly incorporated and the degree of both plane block level parallelism be higher when such additional parallelism is included. The planes can be formed on a single die or on multiple die. In the embodiment of FIG. 42, each plane is shown as having its own ZWR, but if more than one of the planes are formed on the same memory chip there can be a single ZWR for all of the planes on a memory chip.

At the top of FIG. 42, Plane 0,0 and Plane 0,1 are arranged as Plane 0 and Plane 1 for the embodiment of FIG. 41 and receive the inputs $I^{0,0,n}$ for Plane 0,0 and $I^{0,1,n}$ for Plane 0,1. Plane 0,0 and Plane 0,1 compute the outputs of layer-0 using block and plane-level parallelism to generate inputs $I^{1,0,n}$ and $I^{1,1,n}$ for the next stages in the pipeline of Plane 1,0 and Plane 1,1. In the lower part of FIG. 42, Plane 1,0 and Plane 1,1 are arranged as for the previous pipeline stage in Plane 0,0 and Plane 0,1, but now store the weight matrix entries $W^{1,n,n}$ (again stored in transposed form) of the second rather than the $W^{0,n,n}$ entries of the first layer. By supplying the outputs of the first stage to the second stage and applying the inputs $I^{1,0,n}$ and $I^{1,1,n}$ to the layer-1 matrix entries, the outputs of layer-1 are then computed.

It should be noted that the weights of different layers can be stored in the same block, same plane, or both, although this reduces the degree of parallelism as the matrix multiplication of the different layers would not be performed concurrently. This is illustrated by the embodiment of FIG. 43.

Figure 43:
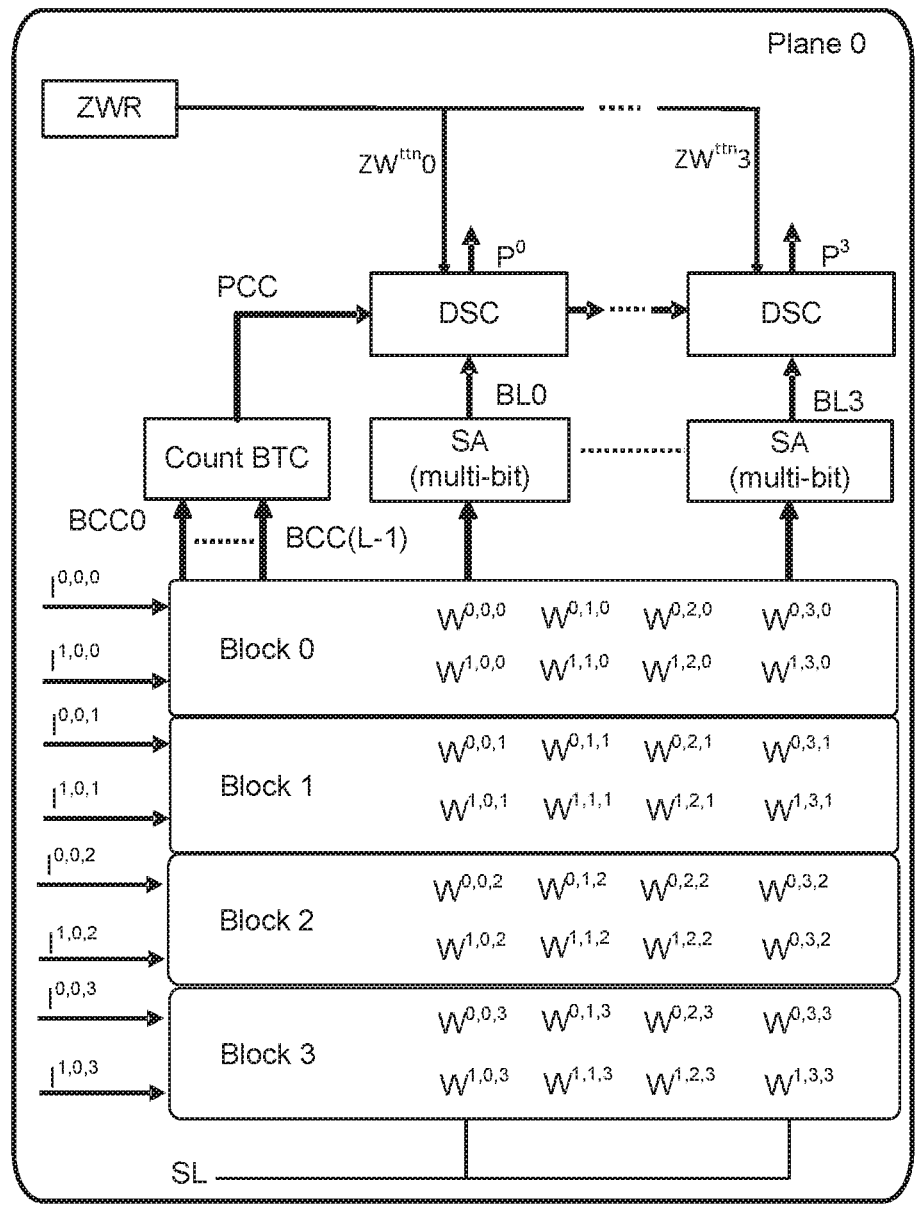
FIG. 43 illustrates an embodiment in which weights of different layers can be stored in the same block, same plane, or both.

FIG. 43 illustrates an embodiment in which weights of different layers can be stored in the same block, same plane, or, in this case, both. More specifically, FIG. 43 shows one plane with the inputs for two layers on one plane, with weights for each in the same block. In this example, the layer 1 weights that were in Plane 1,0 of FIG. 42 are now in the same blocks with the layer 0 weights that were in Plane 0,0 of FIG. 42. Thus, Block 0 in FIG. 43 includes the weights for Input<0> and Input<1> for both of layer 0 and layer 1, and Block 1 includes the weights for Input<2> and Input<3> for both of layer 0 and layer 1. The inputs $I^{0,0,n}$ for layer 0 generate the outputs $P''$ of $I^{1,0,n}$ for layer 0 can then be computed as described with respect to FIG. 39 in a first set of reads. The $I^{1,0,n}$ the serve as the input for layer 1, again as described with respect to FIG. 39, but with the layer 1 weight matrix values $W^{1,n,n}$ to generate the layer 1 outputs in a second set of reads.

The embodiments above present methods and architecture to realize the inference phase of neural network with ternary inputs and binary weights in a NAND memory structure. By use of two serial connected memory cells as a unit synapse, binary weights and binary weights of neural networks can be encoded and stored in a NAND memory array. The digital summation circuit (DSC) can provide the correct final output under the impacts of errors caused by zero weights in TTN. Ternary inputs can be used through use of a simple Zero Input Detection (ZID) circuit. These techniques allow for in-array implementations of matrix multiplication with improved inference accuracy when applying TBN and TTN for large datasets and complicated deep neural network (DNN) structures. Multiple operational modes can be supported via configuring corresponding input/output digital circuits, including a BNN mode (in which disable ZID is disabled and ZWR is set to 0), a TBN mode (in which ZID is enabled, but ZWR is set to 0), and a TTN mode (in which ZID is enabled and ZWR is set to valid data).

Relative to a standard NAND-based architecture, the described embodiments preset a few small feature changes for the existing NAND memory architecture to support various levels of computing parallelism. For the program and erase operations, no circuit changes are needed. A modification is introduced on row, block, and/or plane decoders for controlling read operations to sense weights stored on the two-cell unit synapses, as these use double word line selection with different voltage control and, for multi-block embodiments, multiple blocks selection. The presented digital summation circuit allows for zero inputs and zero weights to be properly incorporated in the in-array dot product computation by the inference engine. The introduction of multi-bit sense amplifiers allow for parallel computation across blocks and planes.

According to a first set of aspects, an apparatus includes an array of non-volatile memory cells and one or more control circuits connected to the array of non-volatile memory cells. The memory cells are configured to store a plurality of ternary valued weights of a neural network, each weight stored in a pair of series non-volatile memory cells. The one or more control circuits are configured to receive a plurality of inputs for a layer of a neural network, convert the plurality of inputs into a corresponding plurality of voltage patterns, apply the plurality of voltage patterns to the array of non-volatile memory cells to thereby perform an in-array multiplication of the plurality of inputs with the ternary valued weights, and accumulate results of the in-array multiplication.

In additional aspects, a method comprises receiving one or more first input values and translating each of the one or more first input values into a corresponding a first voltage pattern, each first voltage pattern being one of a plurality of voltage patterns comprising a pair of voltage values. The one or more first voltage patterns are applied to one or more NAND strings connected to a shared bit line, wherein no more than one of the first voltage patterns is applied to any single one of the NAND strings at a time and the pair of voltage values of each of the first voltage patterns are applied to a corresponding pair of memory cells of a NAND string to which the first voltage pattern is applied. The method further determines a number of the one or more NAND strings connected to the shared bit line that conduct in response to the one or more first voltage patterns being applied thereto. A register values is maintained of a number of pairs of memory cells of the one or more NAND strings storing a first weight value. A first count is incremented based on the number of the one more NAND strings connected to the shared bit line that conduct in response to the one or more first voltage patterns being applied thereto. The first count is adjusted based on the number of pairs of memory cells of the one or more NAND strings storing the first weight value.

Further aspects include an apparatus having a source line, a bit line, a plurality of word lines, and a NAND string. The NAND strings is connected between the source line and the bit line and has a plurality of non-volatile memory cells, the memory cells configured to store a plurality of weight values, each weight value stored in a pair of memory cells and each pair of memory cells connected to a corresponding pair of the word lines. A sense amplifier is connected to the bit line and configured to determine a conductivity state of the NAND string in response to one of a plurality of voltage patterns applied to one of the word line pairs. A register is configured to hold a value indicating a number of the pairs of memory cells storing a specified weight value. A summation circuit is connected to the sense amplifier and to the register, the summation circuit configured to increment a count in response to the conductivity state determined by the sense amplifier and to alter the count in response to the value indicating the number of the pairs of memory cells storing the specified weight value.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
    an array of non-volatile memory cells configured to store a plurality of ternary valued weights of a neural network, each weight stored in a pair of series connected non-volatile memory cells; and
    one or more control circuits connected to the array of non-volatile memory cells, the one or more control circuits configured to receive a plurality of inputs for a layer of a neural network, convert the plurality of inputs into a corresponding plurality of voltage patterns, apply the plurality of voltage patterns to the array of non-volatile memory cells to thereby perform an in-array multiplication of the plurality of inputs with the ternary valued weights, and accumulate results of the in-array multiplication.

2. The apparatus of claim 1, wherein the non-volatile memory cells store data in a ternary format and a weight value of 0 corresponds to both of the memory cells in the pair storing the weight value being in an erased state.

3. The apparatus of claim 1, wherein the plurality of inputs are ternary valued inputs.

4. The apparatus of claim 1, wherein the non-volatile memory cells of the array are arranged as NAND strings, each weight stored in a pair of non-volatile memory cells on a common NAND string.

5. The apparatus of claim 4, wherein the array includes a bit line to which one or more NAND strings, including the common NAND string, are connected, the apparatus further comprising:
    a register, the register configured to hold a value indicating a number of weights with a value of 0 stored in NAND strings connected to the bit line.

6. The apparatus of claim 5, wherein the one or more control circuits are connected to receive the number of weights with a value of 0 stored in NAND strings connected to the bit line, the one or more control circuits further configured to:
    adjust the accumulated results of the in-array multiplication based on the number of weights with a value of 0 stored in NAND strings connected to the bit line.

7. The apparatus of claim 6, wherein the plurality of inputs are ternary valued inputs and the one or more control circuits are further configured to:
    determine a number of the one or more voltage patterns that correspond to a zero input pattern; and
    further adjust the accumulated results of the in-array multiplication based on the number of the one or more voltage patterns that correspond to the zero input pattern.

8. The apparatus of claim 5, wherein the one or more control circuits are further configured to:
    determine the number of weights with a value of 0 stored in NAND strings connected to the bit line; and
    store the number of weights with a value of 0 stored in NAND strings connected to the bit line in the register.

9. The apparatus of claim 4, wherein:
    the array of non-volatile memory cells includes a plurality of NAND strings connected to a common bit line; and
    the one or more control circuits are further configured to concurrently apply the plurality of voltage patterns to the plurality of NAND strings connected to the common bit line and accumulate the results of the in-array multiplication in a multi-bit sensing operation for the common bit line.

10. The apparatus of claim 4, wherein the array of non-volatile memory cells includes:
   a plurality of NAND strings connected to a common bit line;
   and the one or more control circuits are further configured to sequentially apply the plurality of voltage patterns to the plurality of NAND strings connected to the common bit line and accumulate the results of the in-array multiplication in sequential sensing operations.

11. The apparatus of claim 4, wherein the array of non-volatile memory cells includes:
   a first plurality of NAND strings each connected to a corresponding bit line; and
   the one or more control circuits are further configured to concurrently apply a first of the plurality of voltage patterns to the first plurality of NAND strings and independently accumulate a result of the in-array multiplication for each of the first plurality of NAND strings concurrently.

12. The apparatus of claim 1, wherein the one or more control circuits are further configured to provide accumulated results of the in-array multiplication as inputs for a subsequent layer of the neural network.

13. The apparatus of claim 12, further comprising:
   a first plane of non-volatile memory cells including the array of non-volatile memory cells; and
   a second plane non-volatile memory cells storing a plurality of ternary valued weights of the subsequent layer of the neural network.

14. The apparatus of claim 13, wherein
   each weight of the subsequent layer is stored in a pair of series connected non-volatile memory cells of the second plane.

15. The apparatus of claim 4, wherein the array of non-volatile memory cells has a three dimensional architecture in which the NAND strings run in a vertical direction relative to a horizontal substrate.

16. The apparatus of claim 11, wherein the array of non-volatile memory cells comprises a first plane of memory cells and a second plane of memory cells, one or more of the first plurality of NAND strings are in the first plane, and one or more of the first plurality of NAND strings are in the second plane.

* * * * *